US012164541B2

(12) United States Patent
Mankad et al.

(10) Patent No.: US 12,164,541 B2
(45) Date of Patent: Dec. 10, 2024

(54) MULTI-CLUSTER DATABASE MANAGEMENT SYSTEM

(71) Applicant: Nutanix, Inc., San Jose, CA (US)

(72) Inventors: Yashesh Mankad, Sunnyvale, CA (US); Kamaldeep Khanuja, Dublin, CA (US); Balasubrahmanyam Kuchibhotla, San Ramon, CA (US); Anil Madan, San Ramon, CA (US); Manish Pratap Singh, Cupertino, CA (US); Bakul Banthia, San Ramon, CA (US); Sagar Sontakke, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 619 days.

(21) Appl. No.: 17/325,757

(22) Filed: May 20, 2021

(65) Prior Publication Data

US 2022/0067061 A1   Mar. 3, 2022

Related U.S. Application Data

(60) Provisional application No. 63/072,638, filed on Aug. 31, 2020.

(30) Foreign Application Priority Data

Aug. 28, 2020   (IN) .............................. 202041037134

(51) Int. Cl.
  *G06F 16/27*   (2019.01)
  *G06F 9/455*   (2018.01)
  *G06F 16/21*   (2019.01)

(52) U.S. Cl.
  CPC .......... *G06F 16/27* (2019.01); *G06F 9/45558* (2013.01); *G06F 16/21* (2019.01);
  (Continued)

(58) Field of Classification Search
  CPC ...... G06F 16/21; G06F 16/27; G06F 9/45558; G06F 2009/45562
  See application file for complete search history.

(56) References Cited

U.S. PATENT DOCUMENTS

| 5,594,859 A | 1/1997 | Palmer et al. |
| 6,064,975 A | 5/2000 | Moon et al. |

(Continued)

FOREIGN PATENT DOCUMENTS

| CN | 104408071 | 3/2015 |
| CN | 105446828 | 3/2016 |

(Continued)

OTHER PUBLICATIONS

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

(Continued)

*Primary Examiner* — Brittany N Allen
(74) *Attorney, Agent, or Firm* — Foley & Lardner LLP

(57) ABSTRACT

A multi-cluster database management system includes a first cluster in a database management system of a virtual computing system, a second cluster in the database management system, a server on the first cluster, a first agent on the first cluster, and a second agent on the second cluster. The server provides a database management service to a first database stored on the first cluster via the first agent and to a second database stored on the second cluster via the second agent.

21 Claims, 14 Drawing Sheets

(52) U.S. Cl.
CPC ............ *G06F 2009/45562* (2013.01); *G06F 2009/45583* (2013.01); *G06F 2009/45595* (2013.01)

(56) References Cited

U.S. PATENT DOCUMENTS

| | | | |
|---|---|---|---|
| 6,243,715 B1 | 6/2001 | Bogantz et al. |
| D508,248 S | 8/2005 | Ording |
| D521,521 S | 5/2006 | Jewitt et al. |
| 7,136,865 B1 | 11/2006 | Ra et al. |
| 7,225,189 B1 | 5/2007 | McCormack et al. |
| 7,389,300 B1 | 6/2008 | Shah et al. |
| 7,725,671 B2 | 5/2010 | Prahlad et al. |
| D625,315 S | 10/2010 | Jewitt et al. |
| 7,814,057 B2 | 10/2010 | Kathuria et al. |
| 7,840,533 B2 | 11/2010 | Prahlad et al. |
| 7,941,470 B2 | 5/2011 | Le et al. |
| 7,953,764 B2 | 5/2011 | Baffier et al. |
| 7,971,094 B1 | 6/2011 | Benn et al. |
| 8,117,165 B1 | 2/2012 | Winckelmann et al. |
| D656,948 S | 4/2012 | Kundsen et al. |
| 8,150,808 B2 | 4/2012 | Zha et al. |
| 8,250,033 B1 | 8/2012 | De Souter et al. |
| 8,291,409 B2 | 10/2012 | Winner et al. |
| 8,364,648 B1 | 1/2013 | Sim-Tang |
| 8,429,630 B2 | 4/2013 | Nickolov et al. |
| 8,447,728 B2 | 5/2013 | Prahlad et al. |
| 8,448,170 B2 | 5/2013 | Wipfel et al. |
| D684,160 S | 6/2013 | Truelove et al. |
| D684,161 S | 6/2013 | Truelove et al. |
| 8,468,174 B1 | 6/2013 | Yueh et al. |
| 8,549,518 B1 | 10/2013 | Aron et al. |
| 8,601,473 B1 | 12/2013 | Aron et al. |
| 8,612,396 B1 | 12/2013 | McAlister et al. |
| 8,635,421 B2 | 1/2014 | Gupta et al. |
| 8,656,123 B2 | 2/2014 | Lee |
| 8,677,085 B2 | 3/2014 | Vaghani et al. |
| 8,762,335 B2 | 6/2014 | Prahlad et al. |
| 8,769,537 B1 | 7/2014 | Ruggiero et al. |
| 8,832,028 B2 | 9/2014 | Susairaj et al. |
| 8,849,850 B2 | 9/2014 | Baffier et al. |
| 8,850,130 B1 | 9/2014 | Aron et al. |
| 8,863,124 B1 | 10/2014 | Aron |
| 8,874,749 B1 | 10/2014 | Vittal et al. |
| 8,914,567 B2 | 12/2014 | Miroshnichenko et al. |
| 8,924,974 B1 | 12/2014 | Ruggiero et al. |
| 8,972,347 B1 | 3/2015 | Sim-Tang |
| 9,009,106 B1 | 4/2015 | Aron et al. |
| 9,069,708 B2 | 6/2015 | Gill et al. |
| D733,745 S | 7/2015 | Huang |
| 9,116,737 B2 | 8/2015 | Aswathanarayana et al. |
| 9,116,803 B1 | 8/2015 | Agrawal et al. |
| 9,213,727 B1 | 12/2015 | Esposito |
| 9,244,717 B2 | 1/2016 | Pissay et al. |
| D749,117 S | 2/2016 | Huang |
| 9,256,383 B2 | 2/2016 | De Spiegeleer et al. |
| 9,268,610 B2 | 2/2016 | Hegdal et al. |
| 9,270,521 B2 | 2/2016 | Tompkins |
| D753,135 S | 4/2016 | Vazquez |
| D753,140 S | 4/2016 | Kouvas et al. |
| 9,336,060 B2 | 5/2016 | Nori et al. |
| 9,336,132 B1 | 5/2016 | Aron et al. |
| 9,372,758 B2 | 6/2016 | Ashutosh et al. |
| D761,288 S | 7/2016 | Cianflone et al. |
| 9,384,254 B2 | 7/2016 | Tekade et al. |
| 9,389,962 B1 | 7/2016 | Yueh et al. |
| D763,890 S | 8/2016 | Pan |
| 9,413,810 B2 | 8/2016 | Rezvani et al. |
| 9,436,556 B2 | 9/2016 | Siden et al. |
| D771,102 S | 11/2016 | Protzman et al. |
| 9,495,435 B2 | 11/2016 | Zhang et al. |
| 9,507,579 B2 | 11/2016 | Gambardella et al. |
| 9,529,551 B2 | 12/2016 | Kesavan et al. |
| 9,529,808 B1 | 12/2016 | Sudarsanam et al. |
| D777,747 S | 1/2017 | Derby et al. |
| D778,296 S | 2/2017 | Belkin et al. |
| D779,514 S | 2/2017 | Baris et al. |
| D781,887 S | 3/2017 | Dziuba et al. |
| 9,600,193 B2 | 3/2017 | Ahrens et al. |
| 9,639,429 B2 | 5/2017 | Stewart et al. |
| 9,652,265 B1 | 5/2017 | Narayanasamy et al. |
| 9,659,080 B1 | 5/2017 | Drobychev et al. |
| 9,665,437 B2 | 5/2017 | Bhargava et al. |
| D794,666 S | 8/2017 | Havaldar et al. |
| D794,667 S | 8/2017 | Havaldar et al. |
| 9,733,958 B2 | 8/2017 | Cui et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| D797,116 S | 9/2017 | Chapman et al. |
| 9,753,713 B2 | 9/2017 | Mani et al. |
| 9,760,396 B2 | 9/2017 | Apte et al. |
| 9,772,866 B1 | 9/2017 | Aron et al. |
| 9,778,992 B1 | 10/2017 | Yueh et al. |
| D802,608 S | 11/2017 | Hicks et al. |
| D803,231 S | 11/2017 | Guinness et al. |
| D807,902 S | 1/2018 | Cong et al. |
| 9,858,155 B2 | 1/2018 | Ashutosh et al. |
| 9,881,168 B2 | 1/2018 | Chari et al. |
| D809,530 S | 2/2018 | Matheson et al. |
| D815,652 S | 4/2018 | Protzman et al. |
| D817,976 S | 5/2018 | Shilwant et al. |
| 9,960,963 B2 | 5/2018 | Selvaraj et al. |
| 10,013,313 B2 | 7/2018 | Zhang et al. |
| 10,033,833 B2 | 7/2018 | Fu et al. |
| 10,055,300 B2 | 8/2018 | Zhang et al. |
| 10,057,279 B1 | 8/2018 | Balduzzi et al. |
| 10,108,496 B2 | 10/2018 | Hoobler et al. |
| 10,108,685 B2 | 10/2018 | Amdur et al. |
| 10,146,848 B2 | 12/2018 | Narayanan et al. |
| 10,162,715 B1 | 12/2018 | McAlister et al. |
| D838,288 S | 1/2019 | Sunshine et al. |
| 10,185,627 B2 | 1/2019 | Wong et al. |
| D839,913 S | 2/2019 | Chen et al. |
| 10,210,048 B2 | 2/2019 | Sancheti |
| 10,212,195 B2 | 2/2019 | Maskalik et al. |
| D843,388 S | 3/2019 | Protzman et al. |
| 10,248,657 B2 | 4/2019 | Prahlad et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,957 B2 | 8/2019 | Ngo |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,503,612 B1 | 12/2019 | Wang et al. |
| 10,509,798 B2 | 12/2019 | Chow et al. |
| D875,108 S | 2/2020 | Chitalia et al. |
| D877,753 S | 3/2020 | Chitalia et al. |
| 10,579,364 B2 | 3/2020 | Doshi et al. |
| 10,599,423 B2 | 3/2020 | Coleman et al. |
| 10,606,578 B2 | 3/2020 | Kruglikov et al. |
| 10,613,938 B2 | 4/2020 | Blumenau et al. |
| 10,637,914 B2 | 4/2020 | Basavaiah et al. |
| 10,700,991 B2 | 6/2020 | Khinvasara et al. |
| 10,719,407 B1 | 7/2020 | Chockalingam et al. |
| 10,725,866 B1 | 7/2020 | Palaiah et al. |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,778,750 B2 | 9/2020 | Ringdahl |
| 10,785,029 B2 | 9/2020 | Gupta et al. |
| 10,785,255 B1 | 9/2020 | Otvagin et al. |
| 10,812,582 B2 | 10/2020 | Spillane et al. |
| 10,817,157 B2 | 10/2020 | Kuchibhotla et al. |
| 10,824,956 B1 | 11/2020 | Natanzon et al. |
| D911,356 S | 2/2021 | Varghese et al. |
| 10,922,957 B2 | 2/2021 | Rhoads et al. |
| 10,938,924 B1 | 3/2021 | Jensen et al. |
| 10,951,496 B2 | 3/2021 | Baker et al. |

(56) References Cited

U.S. PATENT DOCUMENTS

| | | |
|---|---|---|
| 10,959,098 B2 | 3/2021 | Cidon et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| D926,200 S | 7/2021 | Murphy et al. |
| 11,055,352 B1 | 7/2021 | Beitchman et al. |
| D927,507 S | 8/2021 | Norman |
| 11,108,629 B1* | 8/2021 | Cahyadi ............. G06F 9/45558 |
| 11,126,426 B2 | 9/2021 | Zhu et al. |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1 | 4/2022 | Moghe |
| 11,372,820 B1 | 6/2022 | Harjono et al. |
| 11,386,058 B2 | 7/2022 | Hung et al. |
| 11,561,864 B1 | 1/2023 | Brahmadesam et al. |
| 11,604,705 B2 | 3/2023 | Mehta et al. |
| 11,640,340 B2 | 5/2023 | Sontakke et al. |
| 11,860,818 B2 | 1/2024 | Kuchibhotla et al. |
| 12,019,523 B2 | 6/2024 | Mehta et al. |
| 2001/0014867 A1 | 8/2001 | Conmy |
| 2002/0073089 A1 | 6/2002 | Schwartz et al. |
| 2002/0104376 A1 | 8/2002 | Danyluk et al. |
| 2002/0174098 A1 | 11/2002 | Wu et al. |
| 2003/0147309 A1 | 8/2003 | Weisberg |
| 2005/0149757 A1 | 7/2005 | Corbett et al. |
| 2006/0143412 A1 | 6/2006 | Armangau |
| 2006/0161444 A1 | 7/2006 | Lubrecht et al. |
| 2006/0242189 A1 | 10/2006 | Leetaru et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0126945 A1 | 5/2008 | Munkvold et al. |
| 2008/0239985 A1 | 10/2008 | Karve et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0228669 A1 | 9/2009 | Slesarev et al. |
| 2010/0023564 A1 | 1/2010 | Yerneni et al. |
| 2010/0251242 A1 | 9/2010 | Sivasubramanian et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0252420 A1 | 10/2011 | Tung et al. |
| 2012/0011378 A1 | 1/2012 | Dalton et al. |
| 2012/0123999 A1 | 5/2012 | Ashutosh et al. |
| 2012/0271797 A1 | 10/2012 | Patil |
| 2012/0290714 A1 | 11/2012 | Cohen |
| 2013/0019015 A1 | 1/2013 | Devarakonda et al. |
| 2013/0091285 A1 | 4/2013 | Devarakonda et al. |
| 2013/0117441 A1 | 5/2013 | Kuchibhotla et al. |
| 2013/0263119 A1 | 10/2013 | Pissay et al. |
| 2013/0290180 A1 | 10/2013 | Baffier et al. |
| 2014/0006350 A1 | 1/2014 | Fukui et al. |
| 2014/0059226 A1 | 2/2014 | Messerli et al. |
| 2014/0101117 A1 | 4/2014 | Uzzaman |
| 2014/0189685 A1 | 7/2014 | Kripalani |
| 2014/0201171 A1 | 7/2014 | Vijayan et al. |
| 2014/0229698 A1 | 8/2014 | Sivasubramanian et al. |
| 2014/0250081 A1 | 9/2014 | Stewart et al. |
| 2014/0282256 A1 | 9/2014 | Fish et al. |
| 2014/0359058 A1* | 12/2014 | Karnawat ............. H04L 47/13 709/217 |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0142610 A1 | 5/2015 | Manoharan et al. |
| 2015/0143064 A1 | 5/2015 | Bhargava et al. |
| 2015/0195347 A1 | 7/2015 | Luft |
| 2015/0227435 A1 | 8/2015 | Ashutosh et al. |
| 2015/0227602 A1 | 8/2015 | Ramu et al. |
| 2015/0301814 A1 | 10/2015 | Chen et al. |
| 2015/0331923 A1 | 11/2015 | Kim |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1 | 2/2016 | Madhu et al. |
| 2016/0077923 A1 | 3/2016 | Zhang et al. |
| 2016/0078104 A1 | 3/2016 | Clifford et al. |
| 2016/0092535 A1 | 3/2016 | Kuchibhotla et al. |
| 2016/0094401 A1 | 3/2016 | Anwar et al. |
| 2016/0094410 A1 | 3/2016 | Anwar et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0197835 A1 | 7/2016 | Luft |
| 2016/0224259 A1 | 8/2016 | Ahrens et al. |
| 2016/0267105 A1 | 9/2016 | Sun et al. |
| 2016/0274981 A1 | 9/2016 | Wilkinson |
| 2016/0292358 A1 | 10/2016 | Heger |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1 | 11/2016 | Shivanna et al. |
| 2016/0378622 A1* | 12/2016 | Ren ..................... G06F 11/0712 714/4.11 |
| 2016/0380809 A1 | 12/2016 | Hou et al. |
| 2017/0031775 A1 | 2/2017 | Arumugham et al. |
| 2017/0039236 A1 | 2/2017 | Li et al. |
| 2017/0060699 A1 | 3/2017 | Hohl et al. |
| 2017/0115978 A1 | 4/2017 | Modi et al. |
| 2017/0220777 A1 | 8/2017 | Wang et al. |
| 2017/0235758 A1 | 8/2017 | Gopalapura Venkatesh et al. |
| 2017/0235950 A1 | 8/2017 | Gopalapura Venkatesh et al. |
| 2017/0264684 A1 | 9/2017 | Spillane et al. |
| 2017/0272359 A1 | 9/2017 | Behringer et al. |
| 2017/0286517 A1 | 10/2017 | Horowitz et al. |
| 2017/0286518 A1 | 10/2017 | Horowitz et al. |
| 2017/0344618 A1 | 11/2017 | Horowitz et al. |
| 2017/0351584 A1 | 12/2017 | Griffith et al. |
| 2017/0351716 A1 | 12/2017 | Higginson et al. |
| 2017/0374136 A1 | 12/2017 | Ringdahl |
| 2018/0025007 A1 | 1/2018 | Dai |
| 2018/0121494 A1 | 5/2018 | Antonopoulos et al. |
| 2018/0157561 A1 | 6/2018 | Venkatesh et al. |
| 2018/0181469 A1 | 6/2018 | Yueh et al. |
| 2018/0253676 A1 | 9/2018 | Sheth et al. |
| 2018/0270219 A1 | 9/2018 | Li |
| 2018/0275881 A1 | 9/2018 | Ashraf et al. |
| 2018/0285201 A1 | 10/2018 | Bangalore et al. |
| 2018/0300203 A1 | 10/2018 | Kathpal et al. |
| 2018/0307728 A1 | 10/2018 | Crupi et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0121671 A1 | 4/2019 | Guim Bernat |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0179711 A1 | 6/2019 | Luo et al. |

(56) References Cited

U.S. PATENT DOCUMENTS

| | | |
|---|---|---|
| 2019/0230156 A1 | 7/2019 | McLarty et al. |
| 2019/0235904 A1 | 8/2019 | Epping et al. |
| 2019/0238412 A1 | 8/2019 | Vohra et al. |
| 2019/0245704 A1 | 8/2019 | Pala |
| 2019/0266268 A1 | 8/2019 | Polinati |
| 2019/0310926 A1 | 10/2019 | Hashimoto et al. |
| 2019/0324865 A1 | 10/2019 | Weissman et al. |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0362004 A1 | 11/2019 | Oks et al. |
| 2019/0370146 A1 | 12/2019 | Babu et al. |
| 2019/0384496 A1 | 12/2019 | Abdul Rasheed et al. |
| 2019/0391880 A1 | 12/2019 | Wang et al. |
| 2019/0394093 A1* | 12/2019 | Kulkarni ............. H04L 41/0893 |
| 2020/0028932 A1 | 1/2020 | Yang et al. |
| 2020/0034178 A1 | 1/2020 | Gupta et al. |
| 2020/0034245 A1 | 1/2020 | Kohler |
| 2020/0050522 A1* | 2/2020 | Coleman ............. G06F 11/2041 |
| 2020/0059411 A1 | 2/2020 | Olmsted-Thompson et al. |
| 2020/0081704 A1 | 3/2020 | Bafna et al. |
| 2020/0097177 A1 | 3/2020 | Ashokkumar et al. |
| 2020/0099692 A1 | 3/2020 | Jindal et al. |
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0193388 A1 | 6/2020 | Tran-Kiem et al. |
| 2020/0201526 A1 | 6/2020 | Kuchibhotla et al. |
| 2020/0210378 A1 | 7/2020 | Kuchibhotla et al. |
| 2020/0210379 A1 | 7/2020 | Kuchibhotla et al. |
| 2020/0250046 A1 | 8/2020 | Wong et al. |
| 2020/0250059 A1 | 8/2020 | Bothello et al. |
| 2020/0285608 A1 | 9/2020 | Chakankar et al. |
| 2020/0285652 A1 | 9/2020 | Wang et al. |
| 2020/0349018 A1 | 11/2020 | Meadowcroft et al. |
| 2020/0379793 A1 | 12/2020 | Parihar et al. |
| 2021/0064512 A1 | 3/2021 | Sirov et al. |
| 2021/0117293 A1 | 4/2021 | Luo et al. |
| 2021/0133031 A1 | 5/2021 | Moldvai et al. |
| 2021/0141921 A1 | 5/2021 | Toplak |
| 2021/0141923 A1 | 5/2021 | Wu et al. |
| 2021/0144060 A1 | 5/2021 | Cencini et al. |
| 2021/0200643 A1 | 7/2021 | Luo et al. |
| 2021/0281428 A1 | 9/2021 | Kempf et al. |
| 2021/0391999 A1 | 12/2021 | Chilamakuri et al. |
| 2021/0406717 A1 | 12/2021 | Tauheed et al. |
| 2022/0066993 A1 | 3/2022 | Khanuja et al. |
| 2023/0095814 A1 | 3/2023 | Sarkar |
| 2023/0096071 A1 | 3/2023 | Sarkar |
| 2023/0185823 A1 | 6/2023 | Chu et al. |
| 2023/0195529 A1 | 6/2023 | Luthra et al. |
| 2023/0231912 A1 | 7/2023 | Vohra et al. |
| 2023/0247087 A1 | 8/2023 | Nagaraja et al. |
| 2023/0251938 A1 | 8/2023 | Sontakke et al. |
| 2024/0045834 A1 | 2/2024 | Kuchibhotla et al. |
| 2024/0126777 A1 | 4/2024 | Tylik et al. |
| 2024/0134824 A1 | 4/2024 | Khanuja et al. |

FOREIGN PATENT DOCUMENTS

| | | |
|---|---|---|
| CN | 108664660 | 10/2018 |
| CN | 113010599 | 6/2021 |
| EP | 1 654 683 | 5/2006 |
| EP | 2 980 707 A1 | 2/2016 |
| LU | 102236 B1 | 11/2020 |
| TW | 201600970 A1 | 1/2016 |
| WO | WO-2016/069029 | 5/2016 |
| WO | WO-2020/0264767 | 2/2020 |
| WO | WO-2020/072338 | 4/2020 |
| WO | WO-2021/108075 A1 | 6/2021 |

OTHER PUBLICATIONS

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Balasubramanian, Sudhir, "Virtual Volumes for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Fenton, Tom, "How To Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

Meadowcroft, Ben, "Virtual Volumes: First Year in Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Storti, Brian "A Primer on Database Replication" Brianstorti.com (May 23, 2017) from https://www.brianstorti.com/replication/ (accessed Jun. 28, 2021).

(56) References Cited

OTHER PUBLICATIONS

Virtualization Works, "VMware vFabric Data Director" Virtualization Works: VMware Authorized Online Reseller, (Jun. 2021) from https://www.virtualizationworks.com/vFabric-Data-Director.asp#:~: text=VMware%C2%AE%20vFabric%E2%84%A2%20Data,agility%20and%20reducing%20database%20TCO (accessed Jun. 28, 2021).

Vmware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

Vmware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).

Vmware, "What's New in vSphere 7 Core Storage" VMware The Cloud Platform Tech Zone (May 17, 2021) from https://core.vmware.com/resource/whats-new-vsphere-7-core-storage#sec2-sub5 (accessed Jun. 2, 2021).

Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

Matijaca, Ante, "Dashboard" Dribble, published Dec. 21, 2015, retrieved Feb. 11, 2022 from <https://dribbble.com/shots/2417233-Dashboard> (Year: 2015).

Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).

Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).

WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).

Final Office Action on U.S. Appl. No. 17/337,197 dtd Dec. 15, 2022.

Oracle Cloud, "Using Oracle Autonomous Database on Shared Exadata Infrastructure" published Dec. 2022.

"Amazon RDS Now Supports Setting Up Connectivity Between Your RDS Database and EC2 Compute Instance in 1-Click", Amazon Web Services, https://aws.amazon.com/rds.

"Azure Arc extends the Azure control plane", https://infohub.delltechnologies.com/l/techbook-dell-emc-integrated-system-for-microsoft-azure-stack-hci-2/azure-arc-extends-the-azure-control-plane-14.

"Connected Machine Agent Prerequisites", Sep. 27, 2022, https://learn.microsoft.com/en-us/azure/azure-arc/servers/prerequisites.

"Control Plane", https://docs.controlplane.com.

"Exadata Database Service onCloud@Customer Administrator's Guide", https://docs.oracle.com/en/engineered-systems/exadata-cloud-at-customer/ecccm/ecc-network-requirements.html#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Alhamazani, et al., "Cross-Layer Multi-Cloud Real-Time Application QoS Monitoring and Benchmarking As-a-Service Framework", https://arxiv.org/ftp/arxiv/papers/1502/1502.00206.pdf.

Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

Anthos Technical Overview, https://cloud.google.com/anthos/docs/concepts/overview.

AWS Database Blog, "Configuring and Using Oracle Connection Manager on Amazon for EC2 for Amazon RDS for Oracle", Jan. 12, 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", https://docs.aws.amazon.com/prescriptive-guidance/latest/saas-multitenant-managed-postgresql/pool.html.

AWS Prescriptive Guidance, "Row-Level Security Recommendations", https://docs.aws.amazon.com/prescriptive-guidance/latest/saas-multitenant-managed-postgresql/rls.html.

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Mvware, "Horizon Architecture", https://techzone.vmware.com/resource/horizon-architecture#introduction.

Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.

Oracle, "Oracle Exadata Cloud@Customer X9M", Version 1.17, 2022, https://www.oracle.com/dk/a/ocom/docs/engineered-systems/exadata/exacc-x9m-ds.pdf.

Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.

VMware Horizon, "Horizon Control Plane Services Architecture", Sep. 2021, https://images.techzone.vmware.com/sites/default/files/resource/horizon_control_plane_services_architecture_noindex.pdf.

VMware, "Horizon Cloud on Microsoft Azure Architcture", https://techzone.vmware.com/resource/horizon-cloud-on-microsoft-azure-architecture#introduction.

VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.

VMware, "Horizon Control Plane Services Architecture", Sep. 2021, https://images.techzone.vmware.com/sites/default/files/resource/horizon_control_plane_services_architecture_noindex.pdf.

VMware, "Horizon Messaging", https://docs.vmware.com/en/VMware-Horizon-7/7.13/horizon-architecture-planning/GUID-39B5D03B-F619-4355-A30A-F8544D95539C.html.

VMware, "Learn More About Network Profiles in vRealize Automation Cloud", https://docs.vmware.com/en/vRealize-Automation/

(56) References Cited

OTHER PUBLICATIONS services/Using-and-Managing-Cloud-Assembly/GUID-01E442EE-4004-4ED1-AA32-9CF73F24CB09.html.
VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.
VMware, Cloud Control Plane Management, "Horizon Control Plane Services", https://www.vmware.com/in/products/horizon/controlplane.html.
VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.
YouTube Video screenshots for "Nutanix Business Critical Applications & Databases-.NEXT Europe 2019," YouTube, Oct. 16, 2019, https://www.youtube.com/watch?v=KI7lEmm6j60 [youtube.com].
YouTube Video screenshots for Nutanix , "Nutanix Era .NEXT 2019 Demo", YouTube, May 10, 2019, https://youtu.be/PAWHHdCEArc [youtube.com].
YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].
Foreign Action other than Search Report on EP 21192308.1 dtd Apr. 6, 2022.
Geek University, "VM snapshot files," VMware ESXi course, retrieved Sep. 11, 2022 from https://geek-university.com/vm-snapshot-files/.
Lctree, "Lctree," Linked Clone Tree Visualizer for vCloud Director, published Nov. 28, 2012, retrieved Sep. 11, 2022 from https://urldefense.com/v3/_https:/nam12.safelinks.protection.outlook.com/?url=https*3A*2F*2Fdownload3.vmware.com*2Fsoftware*2Fvmw-tools*2Flctree*2FREADME.pdf&data=05*7C01*7CSubhasri.Das*40unitedlex.com*7C58a08da4913146691ca308da8f2e769b*7Ccdad814b1a7e450ebe0d55f3fd1a2c1d*7C0*7C0*7C6379797269 58112264*7CUnknown*7CTWFpbGZsb3d8eyJWljoiMC4wLjAw MDAiLCJQljoiV2luMzliLCJBTil6lk1haWwi.
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Mulford, Juan, "vSphere 7—Describe Instant Clone Architecture And Use Cases," Mulcas Cloudy Infrastructures, published Dec. 28, 2021, retrieved Sep. 11, 2022 from https://mulcas.com/vsphere-7-describe-instant-clone-architecture-and-use-cases/.
Notion, "Database templates," Notion Help Center, retrieved Sep. 29, 2022 from https://www.notion.so/help/database-templates.
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.
Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.
Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.
Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.
Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.
Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.
Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.
Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.
Tessel for Oracle, "Fully-managed, high-performance Oracle databases with enterprise-grade data protection, security, and compliance@ your terms", 2022, https://www.tessell.io/services/oracle.
VMware Tanzu, "Innovate and grow your business on any and many clouds-fast", 2022.
VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.
VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.
VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.
VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.
VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.
VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.
VMware, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.
VMware, "VMware Horizon 7 Instant-Clone Desktops and RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.
VMware, "VMware Horizon on VMware vSAN Best Practices," Technical White Paper, published Dec. 2020, retrieved Sep. 11,

(56) References Cited

OTHER PUBLICATIONS 2022 from https://www.vmware.com/content/dam/digitalmarketing/vmware/en/pdf/products/vsan/vmware-horizon-7-on-vmware-vsan-best-practices.pdf.
VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.
VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.
Zhang, Junchi, "vFabric Data Director 2.7 customer deck," published May 17, 2013, retrieved Sep. 11, 2022 from https://www.slideshare.net/harryaya/vfabric-data-director-27-customer-deck.
Foreign Search Report on PCT dtd Sep. 7, 2023.
Github. "Multi-tenancy & Row-level Security" Tableau Embedding Playbook. Jul. 7, 2020. Retrieved from https://tableau.github.io/embedding-playbook/pages/04_multitenancy_and_rls (accessed Sep. 28, 2023).
Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).
Kubernetes. "Authenticating" Kubernetes Documentation. Jul. 12, 2018. Retrieved from https://kubernetes.io/docs/reference/access-authn-authz/authentication/ (accessed Oct. 11, 2023).
Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).
Kubernetes. "Nodes" Kubernetes Documentation. Jul. 14, 2017. Retrieved from https://kubernetes.io/docs/concepts/architecture/nodes/ (accessed Oct. 11, 2023).
Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).
Kubernetes. "PKI certificates and requirements" Kubernetes Documentation. Jun. 16, 2019. Retrieved from https://kubernetes.io/docs/setup/best-practices/certificates/ (accessed Oct. 11, 2023).
Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).
Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).
Progress. "Simple tenancy" Progress Documentation. Apr. 12, 2017. Retrieved from https://docs.progress.com/bundle/openedge-database-management-117/page/Simple-tenancy.html (accessed Sep. 28, 2023).
Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).
Progress. "Tenant-ID() method" Progress Documentation. Jun. 2011. Retrieved from https://docs.progress.com/bundle/abl-reference/page/TENANT-ID-method.html# (accessed Sep. 28, 2023).
Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).
Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).
Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).
YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).
YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).
YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).
AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).
AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).
AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).
AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).
Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).
Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).
"Configure cross-tenant access settings for B2B collaboration", Azure AD, Microsoft Entra, May 24, 2022, 21pp.
Amazon Web Services, "SaaS Tenant Isolation Strategies. Isolating Resources in a Multi-Tenant Environment", (Aug. 2020).
AWS Serverless SaaS Workshop—Lab4 : Isolating tenant data in a pooled model—Adding the missing code.
AWS Serverless SaaS Workshop—Lab4 : Isolating tenant data in a pooled model—Revisiting Authentication, Authorization, & Tenant Isolation.
Cunningham, "Introducing PlanetScale Managed Cloud", Nov. 3, 2021, https://planetscale.com/blog/introducing-planetscale-managed-cloud.
Guevara, Introducing PlanetScale Insights: Advanced query monitoring, May 26, 2022, https://planetscale.com/blog/introducing-planetscale-insights-advanced-query-monitoring.
PlanetScale, Deployment Options Documentation, Aug. 1, 2022, https://planetscale.com/docs/concepts/deployment-options#cloud.
PlanetScale, Query Insights Documentation, 2022, https://planetscale.com/docs/concepts/query-insights#insights-page-overview.
PlanetScale, The MySQL-compatible serverless database platform, 2022, https://planetscale.com.
Stone, "Cross Tenant Access", LoanPro Help, https://help.loanpro.io/article/vyy37c5bhd-cross-tenant-access, accessed Jun. 29, 2022.
Tang, "Multi-tenant access control for cloud services", Aug. 2014, The University of Texas at San Antonio College of Sciences.
BackupAssist, "https://backupassist.com/support/en/backupassist/manage/calendar.htm", Jul. 1, 2017 (Year: 2017).
Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

(56) References Cited

OTHER PUBLICATIONS

Delphix Corp., "Delphix Engine User Guide," Delphix, published Dec. 2017, retrieved Jan. 2, 2023 from https://docs.delphix.com/docs52/files/83053093/83053098/2/1512670775673/Delphix Engine User Guide.pdf.
Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.
Delphix Corp., "Delphix Engine User Guide," Delphix, published Oct. 2017, retrieved Jan. 2, 2023 from https://docs.delphix.com/docs-old/files/74711255/74715951/5/1509647013871/Delphix Engine User Guide.pdf.
Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).
Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.
Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.
Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.
Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guide for 5.2.pdf.
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.
Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.
Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.
YouTube Video for Delphix Corp., "How To Create Database Copies with Delphix," YouTube, Apr. 3, 2018, https://www.youtube.com/watch?v=1EjR-k4EJ68 [youtube.com].
YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].
Actifio Enablement Team, "https:/Awww.youtube.com/watch?v=7mCcJTXxFM3l", "Oracle Advanced Data Protection and Workflows", May 15, 2018 ) (Year: 2018).
AWS. "Amazon EC2 M5 Instances" Amazon DocumentDB. Amazon EC2. Nov. 2017. Retrieved from https://aws.amazon.com/ec2/instance-types/m5/ (accessed Apr. 6, 2023).
AWS. "Amazon ECS clusters" Amazon Elastic Container Service. Dec. 2019. Retrieved from https://docs.aws.amazon.com/AmazonECS/latest/developerguide/clusters.html (accessed Apr. 6, 2023).
AWS. "AWS glossary" AWS General Reference Guide. Jan. 2013. Retrieved from https://docs.aws.amazon.com/general/latest/gr/glos-chap.html (accessed Apr. 6, 2023).
AWS. "Copy a snapshot" Amazon Elastic Compute Cloud. Dec. 2012. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Dec. 2014. Retrieved from https://docs.aws.amazon.com/AWSEC2/latest/APIReference/API_CopySnapshot.html (accessed Apr. 6, 2023).
AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).
AWS. "CreateDBInstanceReadReplica" Amazon Relational Database Service. Jan. 16, 2013. Retrieved from https://docs.aws.amazon.com/AmazonRDS/latest/APIReference/API_CreateDBInstanceReadReplica.html (accessed Apr. 25, 2023).
AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).
AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).
AWS. "Introducing Five New Amazon EC2 Bare Metal Instances" Amazon Web Services. Feb. 13, 2019. Feb. 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Jun. 2018. Retrieved from https://aws.amazon.com/kubernetes/#:~: text=Kubernetes%20manages%20clusters%20of%20Amazon,premises%20and%20in%20the%20cloud (accessed Apr. 6, 2023).
AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).
AWS. "Storage" Amazon Elastic Compute Cloud. Sep. 14, 2014. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Apr. 27, 2020. Retrieved from https://docs.aws.amazon.com/AWSEC2/latest/UserGuide/ebs-accessing-snapshot.html (accessed Apr. 6, 2023).
AWS. "Working with DB instance read replicas" Amazon Relational Database Service. Jan. 18, 2013. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Nov. 30, 2020. Retrieved from https://docs.aws.amazon.com/AmazonRDS/latest/UserGuide/SQLServer.ReadReplicas.html (accessed Apr. 25, 2023).
Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).
Barr, Jeff. "New—Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).
DBInsight. "Turn your Database into a Service" A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).
Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).
Final Office Action on U.S. Appl. No. 16/234,547 dtd May 11, 2023.
Final Office Action on U.S. Appl. No. 16/805,581 dtd Jul. 6, 2022.
Flexera. "How can I copy an EBS snapshot between different EC2 regions?" Flexera CMP Docs. Dec. 19, 2015. Retrieved from

(56) References Cited

OTHER PUBLICATIONS https://docs.rightscale.com/faq/clouds/aws/How_can_I_copy_an_EBS_snapshot_between_different_EC2_regions.html (accessed Apr. 6, 2023).
Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).
Jain, Viral. "How To Create SQL Database in AWS" C-Sharp Corner. May 4, 2018. Retrieved from https://www.c-sharpcorner.com/article/how-to-create-sql-database-in-aws/ (accessed Jul. 26, 2023).
Microsoft. "Basic Always on availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).
Non-Final Office Action on U.S. Appl. No. 16/805,581 dtd Jan. 14, 2022.
Non-Final Office Action on U.S. Appl. No. 16/805,581 dtd Oct. 12, 2022.
Non-Final Office Action on U.S. Appl. No. 17/337,197 dtd Jun. 6, 2023.
Nutanix Inc., "Prism 5.5, Prism Central Guide" (Jul. 7, 2020) pp. 1-618.
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
PlanetScale. "PlanetScale is the world's most advanced serverless MySQL platform" PlanetScale. Retrieved from https://planetscale.com/ (accessed Apr. 6, 2023).
Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).
Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).
Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).
YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGoIVFBuU [youtube.com].
YouTube Video screenshots for Alibaba Cloud. "How-to | Launch a MySQL Instance on Alibaba Cloud ApsaraDB for Relational Database Service" YouTube. Feb. 27, 2017. https://youtube.com/watch?v=E5wGoIVFBuU [youtube.com].
YouTube Video screenshots for Alibaba Cloud. "How-to | Set Up a Multi tier WordPress Site on Alibaba Cloud" YouTube. Jun. 25, 2018. https://youtu.be/yWXhibyIW6M [youtube.com].
YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].
YouTube Video screenshots for Nutanix University. "How To Provision a PostgreSQL cluster using Nutanix Era | Nutanix University" YouTube. Aug. 8, 2019. https://youtube.com/watch?v=FoDGtORWNnU [youtube.com].
Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).
Extended European Search Report re EP21192308.1 dtd Jan. 24, 2022.
Extended European Search Report re EP21192379.2 dtd Jan. 26, 2022.
Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).
Gui, Huan et al. "Network A/B Testing: From Sampling to Estimation" Proceedings of the 24th International Conference on World Wide Web (WWW 15), pp. 399-409, May 18, 2015. DOI: 10.1145/2736277.2741081 (Year: 2015).
Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7891-1 (Year: 2017).
Microsoft SQL, "Upgrading Always on Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Nyffenegger et al., "SQL Server Instance" 2017, from https://renenyffenegger.ch/notes/development/databases/SQL-Server/architecture/instance (retrieved Jan. 25, 2022).
Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).
Warner, Alex et al., "Chapter 16—Canarying Releases" (published 2018) Google Workbook published by O'Reilly Media, Inc., from https://sre.google/workbook/canarying-releases/ (accessed Sep. 14, 2021).
Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).
AWS. "Amazon Relational Database Service (RDS)" Amazon Relational Database Service. Dec. 24, 2017. Retrieved from https://web.archive.org/web/20171224182936/https:/aws.amazon.com/rds/#features (accessed Sep. 6, 2023).
AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).
AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted.CreatingConnecting.MySQL.html (accessed Sep. 6, 2023).
AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).
AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).
AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).
AWS. "Regions and Availability Zones" Amazon Relational Database Service. Dec. 22, 2017. Retrieved from https://web.archive.

(56) References Cited

OTHER PUBLICATIONS org/web/20171222195304/http:/docs.aws.amazon.com/AmazonRDS/latest/UserGuide/Concepts.RegionsAndAvailabilityZones.html (accessed Sep. 6, 2023).

AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).

Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).

Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).

Google Cloud. "Creating Instances" Database Products. Sep. 18, 2018. Retrieved from https://web.archive.org/web/20180918103721/https:/cloud.google.com/sql/docs/mysql/create-instance (accessed Sep. 6, 2023).

Google Cloud. "Rest Resource: subnetworks" Compute Engine. Jul. 1, 2019. Retrieved from https://cloud.google.com/compute/docs/reference/rest/beta/subnetworks (accessed Sep. 6, 2023).

Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).

Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).

Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).

Matijaca, Ante, "Dashboard" Dribbble, published Dec. 21, 2015, retrieved Feb. 11, 2022 from <https://dribbble.com/shots/2417233-Dashboard> (Year: 2015).

Mongodb. "mongo Shell Methods" Reference. Aug. 2019. Retrieved from https://www.mongodb.com/docs/v4.2/reference/method/ (accessed Aug. 30, 2023).

Mongodb. "mongodb" GitHub. Mar. 2015. Retrieved from https://github.com/mongodb/docs/blob/v4.2/source/core/replica-set-priority-0-member.txt (accessed Aug. 30, 2023).

Mongodb. "Priority 0 Replica Set Members" MongoDB Manual. Aug. 2019. Retrieved from https://www.mongodb.com/docs/manual/core/replica-set-priority-0-member/ (accessed Aug. 30, 2023).

Mongodb. "Replica Set Elections" MongoDB Manual. Aug. 2019. Retrieved from https://www.mongodb.com/docs/manual/core/replica-set-elections/ (accessed Aug. 30, 2023).

Mongodb. "Replica Set Members" Replication. Aug. 2019. Retrieved from https://www.mongodb.com/docs/v4.2/core/replica-set-members/#replica-set-secondary-members (accessed Aug. 30, 2023).

Mongodb. "The mongo Shell" MongoDB. Aug. 2019. Retrieved from https://www.mongodb.com/docs/v4.2/mongo/ (accessed Aug. 30, 2023).

Mongodb. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).

Mongodb. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).

MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).

Non-Final Office Action on U.S. Appl. No. 17/694,964 DTD Aug. 9, 2023.

Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).

Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).

Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).

Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).

Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).

Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).

Quest. "Creating custom User-defined Database Groups" Support. Aug. 16, 2017. Retrieved from https://support.quest.com/kb/4229519/creating-custom-user-defined-database-groups (accessed Aug. 30, 2023).

Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).

Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 23).

Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

Tudip Digital. "What is Deployment Manager?" Tudip. Jun. 24, 2019. Retrieved from https://tudip.com/blog-post/what-is-deployment-manager/ (accessed Sep. 6, 2023).

Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 23).

YouTube Video screenshots for "Nutanix Business Critical Applications & Databases- .NEXT Europe 2019," YouTube, Oct. 16, 2019, https://www.youtube.com/watch?v=KI7IEmm6j60 [youtube.com].

YouTube Video screenshots for "Nutanix Era .NEXT 2019 Demo," YouTube, May 10, 2019, https://www.youtube.com/watch?v=8hbpfrOSwOU [youtube.com].

YouTube Video screenshots for Cloud Advocate. "Google Cloud Deployment Manager—Getting Started" YouTube. Aug. 28, 2020. https://youtu.be/qVKp7W1bfrE [youtube.com].

AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).

AWS. "Amazon EC2 M5 Instances" Amazon DocumentDB. Amazon EC2. Retrieved from https://aws.amazon.com/ec2/instance-types/m5/ (accessed Apr. 6, 2023).

AWS. "Amazon ECS clusters" Amazon Elastic Container Service. Retrieved from https://docs.aws.amazon.com/AmazonECS/latest/developerguide/clusters.html (accessed Apr. 6, 2023).

(56) References Cited

OTHER PUBLICATIONS

AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).
AWS. "AWS glossary" AWS General Reference Guide. Retrieved from https://docs.aws.amazon.com/general/latest/gr/glos-chap.html (accessed Apr. 6, 2023).
AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).
AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).
AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).
AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).
AWS. "Kubernetes on AWS" Amazon Web Services. Retrieved from https://aws.amazon.com/kubernetes/#:~: text=Kubernetes%20manages%20clusters%20of%20Amazon,premises%20and%20in%20the%20cloud (accessed Apr. 6, 2023).
AWS. "Storage" Amazon Elastic Compute Cloud. Retrieved from https://docs.aws.amazon.com/AWSEC2/latest/WindowsGuide/Storage.html (accessed Apr. 6, 2023).
AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).
AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).
AWS. "What is an Instance in Cloud Computing?" Amazon Web Services. Retrieved from https://aws.amazon.com/what-is/cloud-instances/#:~: text=You%20can%20run%20multiple%20virtual,of%20sharing%20and%20scaling%20resources (accessed Apr. 6, 2023).
AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).
AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).
Final Office Action on U.S. Appl. No. 16/805,581 dated Jul. 6, 2022.
Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).
Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).
Notice of Allowance on U.S. Appl. No. 16/805,581 dtd Apr. 3, 2023.
Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).
Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).
Tessell. "Differentiated Infrastructure. Delightful Management." Tessell. Retrieved from https://query.prod.cms.rt.microsoft.com/cms/api/am/binary/RW13XNT (accessed Apr. 6, 2023).
Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).
Tessell. "The Tessell platform provides unparalleled security for your data and users" Tessell. Retrieved from https://query.prod.cms.rt.microsoft.com/cms/api/am/binary/RW13XNU (accessed Apr. 6, 2023).
Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).
AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).
Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).
Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).
Cano, Ignacio, et al. "Curator: Self-Managing Storage for Enterprise Clusters" (Mar. 27, 2017), from https://www.usenix.org/conference/nsdi17/.
Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).
Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).
Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).
Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).
Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).
Delphix "Database Provisioning Overview" (published 2017) Delphix Corp., from https://docs.delphix.com/docs/introduction/database-virtualization-with-delphix/database-provisioning-overview (accessed Dec. 19, 2019).
Delphix "Quick Start Guides" (published 2017) Delphix Corp., from https://docs.delphix.com/docs52/quick-start-guides (accessed Dec. 19, 2019).
Delphix "Replication" (Published 2017) Delphix Corp., from https://docs.delphix.com/docs52/data-backup-and-recovery-solutions/replication (accessed Dec. 19, 2019).
Delphix, "Understanding SnapSync and LogSync for Oracle" (May 5, 2013) from https://www.delphix.com/blog/data-virtualization/understanding-snapsync-and-logsync-oracle (accessed Jan. 7, 2020).
Drake, Sam et al. "Architecture of Highly Available Databases" International Service Availability Symposium, pp. 1-16. Springer, Berlin, Heidelberg, 2004. (Year: 2004).
Dremio, "Multiple AWS Clusters" Dremio. 2020. Received from https://docs.dremio.com/deployment/provisioning-ec2.html (Year: 2020).
Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017/07/designing-perfect-date-time-picker/> (Year: 2017).
Geier, Eric, "Using Static IP Addresses on Your Network" Cisco Press. Sep. 14, 2009. Received from https://www.ciscopress.com/articles/article.asp?p=1393495. (Year: 2009).

(56) References Cited

OTHER PUBLICATIONS

Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

M. A. Metawai et al. "Load balancing in distributed multi-agent computing systems" Ain Shams Engineering Journal. ASEJ. May 23, 2012. p. 237-249. (Year: 2012).

Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).

Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).

Microsoft Docs, "Always on availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.

Microsoft Docs, "What is an Always on availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.

Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).

Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).

Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).

Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).

Non-Final Office Action on U.S. Appl. No. 16/228,728 dtd Mar. 24, 2020.

Non-Final Office Action on U.S. Appl. No. 16/234,547 dtd Apr. 15, 2021.

Non-Final Office Action on U.S. Appl. No. 16/234,553 dtd Jan. 6, 2021.

Notice of Allowance on U.S. Appl. No. 16/228,728 dtd Jul. 1, 2020.

Notice of Allowance on U.S. Appl. No. 16/234,553 dtd Mar. 30, 2021.

Notice of Allowance on U.S. Appl. No. 29/673,554 dtd Apr. 17, 2020.

Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJWOZPW22N (Year: 2020).

Oracle Communications, "Provisioning Database Interface User's Guide, Release 16.0" (Sep. 2014) Oracle, p. 1-174.

Oracle Help Center, "Enterprise Manager Lifecycle Management Administrator's Guide, 4. Overview of Database Provisioning" (2019) from, https://docs.oracle.com/cd/E24628_01/em.121/e27046/prov_db_overview.htm#EMLCM12206, (accessed Dec. 17, 2019).

Patil, Manoj E. et al. "Design and Implementation of Graphical User Interface for Relational Database Management System" (2012), International Jounral of Computer Science and Information Technologies (IJCSIT), vol. 3 (3), p. 3871-3874.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Red Hat "Chapter 4. Configuring The Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).

Reed, Kate "Nutanix Introduces Database Services with Era" (published May 9, 2018) Business Wire, from https://www.businesswire.com/news/home/20180509005397/en/ (accessed Dec. 18, 2019).

Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).

Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

Sanglaji, Maryam et al. "Nutanix Era: Databases Made Simple" (published 2018) Nutanix, from https://www.nutanix.com/blog/nutanix-era-databases-made-simple (accessed Dec. 18, 2019).

Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).

Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).

Sharit, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).

Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using- haproxy-and-pgbouncer (Year: 2020).

Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

(56) References Cited

OTHER PUBLICATIONS

The Nutanix Bible; from https://nutanixbible.com/; accessed on Jun. 8, 2017.
The Nutanix Bible; from https://nutanixbible.com/; accessed on Jun. 9, 2016.
VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).
VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).
Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).
YouTube Video screenshots for "Bala Kuchibhotla, Nutanix | Nutanix.NEXT EU 2019," YouTube, Oct. 10, 2019, https://www.youtube.com/watch?v=_0Ma-2092Y0 [youtube.com].
YouTube Video screenshots for "Nutanix Era .NEXT 2019 Demo," You Tube, May 10, 2019, https://www.youtube.com/watch?v=PAWHHdCEArc&t=267s [youtube.com].
Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).
Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).
Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).
Non-Final Office Action on U.S. Appl. No. 17/951,632 dtd Sep. 14, 2023.
"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.
"Cloning a volume for an Amazon Aurora DB cluster", https://docs.aws.amazon.com/AmazonRDS/latest/AuroraUserGuide/Aurora.Managing.Clone.html.
"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.
"Enterprise Manager Cloud Administration Guide", Oracle Help Center, 2024, https://docs.oracle.com/cd/E24628_01/doc.121/e28814/cloud_db_clonesnap.htm#CEGCJCBC.
"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.
Maruthachalam, et al., "A Distributed System Design for Next Generation Storage and Remote Replication", 2014, https://ieeexplore.IEEE.org/abstract/document/6814686.

\* cited by examiner

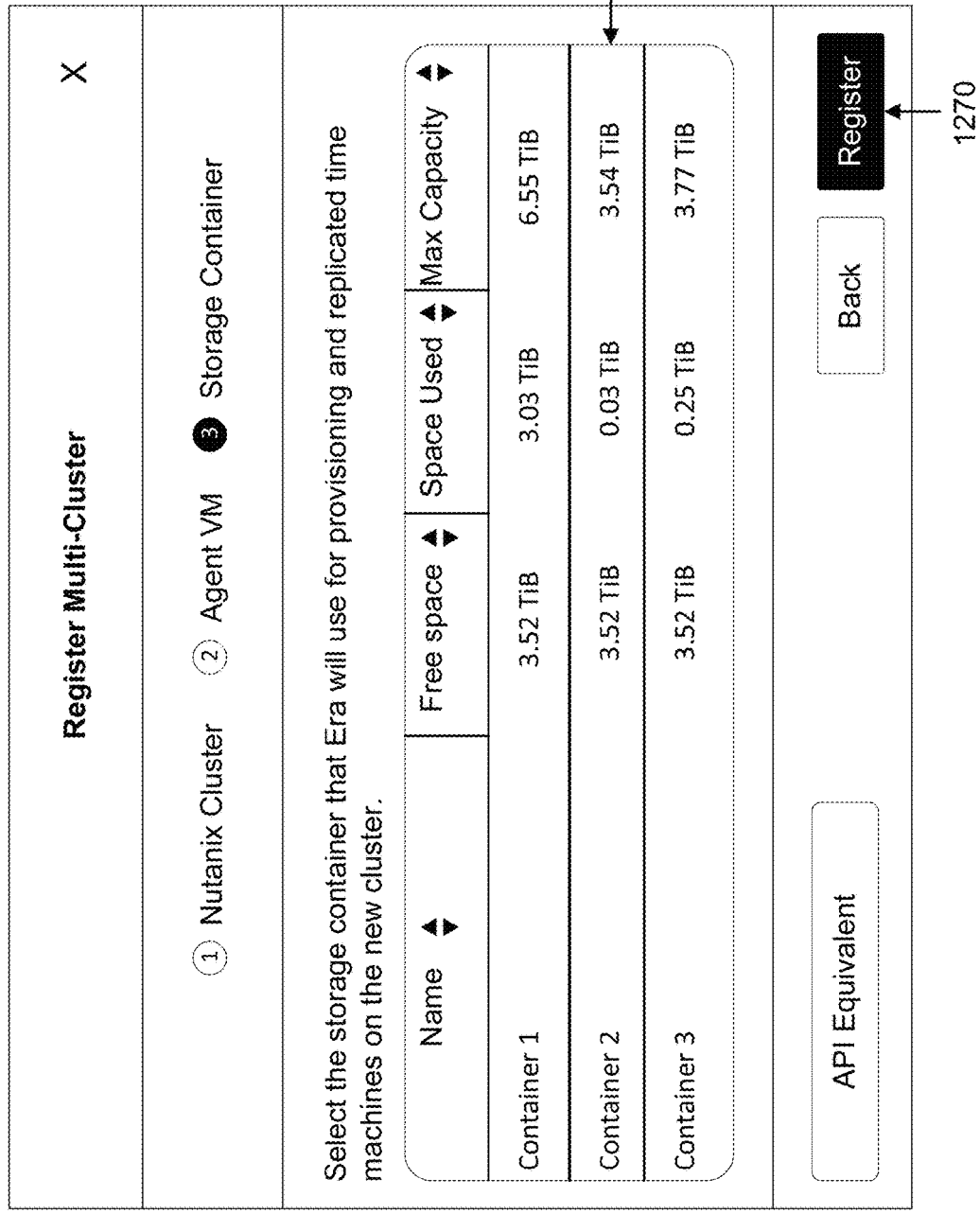

MULTI-CLUSTER DATABASE MANAGEMENT SYSTEM

CROSS-REFERENCE TO RELATED APPLICATIONS

This application claims priority from U.S. Provisional Application No. 63/072,638, filed on Aug. 31, 2020 and Indian Application No. 202041037134, filed on Aug. 28, 2020, the entireties of which are incorporated by reference herein.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a non-transitory computer-readable media having computer-readable instructions stored thereon is disclosed. The computer-readable instructions when executed by a processor of a database management system cause the processor to receive first network information to convert a single-cluster configuration of the database management system into a multi-cluster configuration of the database management system and convert the single-cluster configuration into the multi-cluster configuration. In the single-cluster configuration, a server and a first agent are co-located on a first virtual machine on a first cluster and in the multi-cluster configuration, the server is located on the first virtual machine and the first agent is located on a second virtual machine on the first cluster. The computer-readable instructions also cause the processor to receive second network information to register a second cluster with the server upon conversion to the multi-cluster configuration and create a second agent on the second cluster upon registering the second cluster. The server provides a database management service via the first agent and the second agent.

In accordance with some other aspects of the present disclosure, a method is disclosed. The method includes receiving, by a processor executing computer-readable instructions stored on a memory, first network information for converting a single-cluster configuration of a database management system into a multi-cluster configuration of the database management system and converting, by the processor, the single-cluster configuration into the multi-cluster configuration. In the single-cluster configuration, a server and a first agent are co-located on a first virtual machine on a first cluster, and in the multi-cluster configuration, the server is located on the first virtual machine and the first agent is located on a second virtual machine on the first cluster. The method further includes receiving, by the processor, second network information for registering a second cluster with the server upon conversion to the multi-cluster configuration and creating, by the processor, a second agent on the second cluster upon registering the second cluster. The server provides a database management service via the first agent and the second agent.

In accordance with some other aspects of the present disclosure, a system is disclosed. The system includes a memory storing computer-readable instructions thereon and a processor that executes the computer-readable instructions to receive first network information to convert a single-cluster configuration of the database management system into a multi-cluster configuration of the database management system and convert the single-cluster configuration into the multi-cluster configuration. In the single-cluster configuration, a server and a first agent are co-located on a first virtual machine on a first cluster, and in the multi-cluster configuration, the server is located on the first virtual machine and the first agent is located on a second virtual machine on the first cluster. The processor further executes the computer-readable instructions to receive second network information to register a second cluster with the server upon conversion to the multi-cluster configuration and create a second agent on the second cluster upon registering the second cluster. The server provides a database management service via the first agent and the second agent.

In accordance with some other aspects of the present disclosure, a system is disclosed. The system includes a first cluster in a database management system of a virtual computing system, a second cluster in the database management system, a server on the first cluster, a first agent on the first cluster, and a second agent on the second cluster. The server includes a processor that executes computer-readable instructions stored on a memory of the server to provide a database management service to a first database stored on the first cluster via the first agent and to a second database stored on the second cluster via the second agent.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGS. 12A-12C are example user interfaces showing registering of a new cluster in the multi-cluster configuration of FIG. 4, as described in FIGS. 7 and 8, in accordance with some embodiments of the present disclosure.

Figure 1:
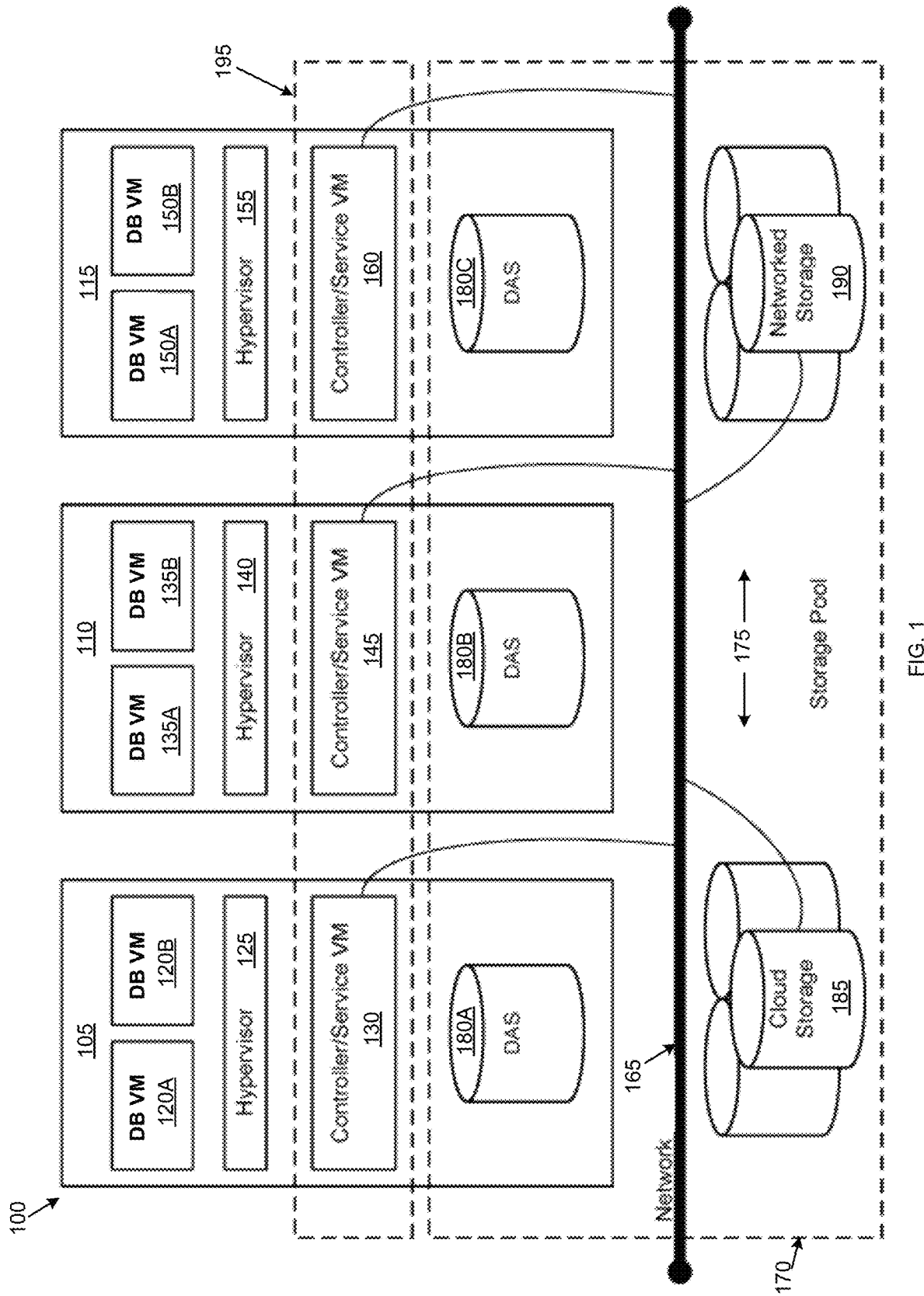
FIG. 1 is an example block diagram of a cluster in a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtual computing system having a plurality of clusters, with each of the plurality of clusters having a plurality of nodes. Each of the plurality of nodes includes one or more virtual machines and other entities, which may be managed by an instance of a monitor such as a hypervisor. These and other components may be part of a datacenter, which may be managed by a user (e.g., an administrator or other authorized personnel). A distributed storage system, for providing storage and protection capabilities, may be associated with the virtual computing system and shared at least partially by each of the plurality of nodes. The virtual computing system may be configured as a database system for providing database management services. For example, at least some of the one or more virtual machines within the virtual computing system may be configured as database server virtual machines for storing one or more databases. These databases may be managed by a database management system. The database management system may provide a plurality of database services. For example, in some embodiments, the database system may provide database provisioning services and copy data management services.

Database provisioning services involve creating new databases. Creating a new database may be a complex and long drawn process. A user desiring to create a new database with a provider of the database management system may make a new database creation request with the database provider. The user request may pass through multiple entities (e.g., people, teams, etc.) of the database provider before a database satisfying the user request may be created. For example, the user may be required to work with a first entity of the database provider to specify the configuration (e.g., database engine type, number of storage disks needed, etc.) of the database that is desired. Upon receiving the database configuration, another entity of the database provider may configure a database server virtual machine for hosting the database, while yet another entity may configure the networking settings to facilitate access to the database upon creation. Yet another entity of the database provider may configure database protection services to backup and protect the database. All of these tasks may take a few to several days. Thus, creating a database may be a time intensive process and inconvenient for the user. The user may not have the time or desire to wait for multiple days to create a database. Further, creating the database using the above procedure requires the user to rely on other entities. If these other entities become unavailable, the user may have no choice but to wait for those entities to become operational again. Additionally, the user may not be fully privy to or even understand the various configurational details of the desired database that the user may be asked to provide to the other entities for creating the database. The present disclosure provides technical solutions to the above problems.

Specifically, the database management system of the present disclosure greatly simplifies the database provisioning service. The database management system of the present disclosure allows the user to quickly and conveniently create a new database and associate the database with the database management system without the need for contacting and working with multiple entities. The entire process of creating and associating the database with the database management system may be completed by the user within a span of a few minutes (or less) instead of the multiple days mentioned above. The database management system of the present disclosure provides a user friendly, intuitive user interface that solicits information from and conveniently walks the user through the various steps for creating a new database within minutes. The database management system may include a catalog of standardized configurations, which the user may select from the user interface for creating the database. The user may modify the standardized configurations or create custom configurations to suit their needs. By virtue of providing standardized configurations, the present disclosure simplifies the database creation process for the user. The user interface also hides the complexity of creating the database from the user. For example, the user need not worry about creating, partitioning, or associating storage space (e.g., storage disk space) with the database that is being created. The user may simply specify a size of the database that is desired in the user interface and the database management system may automatically translate that size into storage space. Thus, based upon the needs of the user, the user is able to specifically tailor the database during creation and create the database easily and quickly using the user interface.

The database management system may also provide the ability to register an existing database with the database management system. Such existing databases may have been created outside of the database management system (e.g., by a different database provider or vendor). Users having existing databases may desire to associate their databases with the database management system (e.g., when changing vendors). Similar to creating a new database in the database management system, registering an existing database with the database management system is easy, convenient, and may be completed within a span of a few minutes (or less) via the user interface. As with the creation of a new database, the user interface walks the user through the registration process, provides standardized configurations for the user to select from, ability to modify the standardized configurations, and create new configurations. Upon registering the database with the database management system, the database may take advantage of other database management services offered by the database system.

Another database management service may include copy data management. Copy data management services involve protecting a database. Protecting a database means replicating a state of the database for creating a fully functional copy of the database. Replicating the state of the database may involve creating fully functional clones (e.g., back-ups) of the database. Replicating the state of the database may also include restoring a database. Since the clones are fully functional copies of the original or source database, a user may perform operations on the cloned copy that would otherwise be performed on the original database. For example, the user may perform reporting, auditing, testing, data analysis, etc. on the cloned copy of the original database. A cloned database or restored database may be created by periodically capturing snapshots of the database. A snapshot stores the state of the database at the point in time at which the snapshot is captured. The snapshot is thus a point in time image of the database. The snapshot may include a complete encapsulation of the virtual machine on which the database is created, including the configuration data of the virtual machine, the data stored within the database, and any metadata associated with the virtual machine. Any of a variety of snapshotting techniques may be used. For example, in some embodiments, copy-on-write, redirect-on-write, near-sync, or other snapshotting methods may be used to capture snapshots. From the snapshot, the source database may be recreated to the state at which the snapshot was captured.

However, the number of snapshots that are captured in a given day may be limited. Specifically, because capturing a snapshot requires quiescing (e.g., pausing) the database and entering a safe mode in which user operations are halted, it may be desirable to take only a minimum number of snapshots in a day. Thus, choices of state that may recreated from a snapshot may be limited. If a state is desired that falls between the capture of two snapshots, the user may be out of luck. Thus, the desire to limit the number of snapshots in a day results in a significant technical problem that results in losing changes made to a database since the last snapshot capture or between two snapshot captures. The present disclosure provides technical solutions to these problems.

Specifically, the present disclosure automatically creates an instance of a database protection system for each database (e.g., source database) that is created within (or registered with) the database management system. The database protection system instance may be configured to protect the database by automatically capturing snapshots of the database. Additionally, to avoid losing changes in state between two snapshot captures or since the last snapshot capture, the database system may capture transactional logs. A transactional log may be a text, image, disk, or other type of file that records every transaction or change that occurs on the source database since a last snapshot capture. Thus, by using the snapshots or a combination of snapshots and transactional logs, any state of the source database down to the last second (or even fractions of seconds or other time granularities) may be recreated. Specifically, states of the source database that fall between the capture of two snapshots may be recreated by using a combination of snapshots and transactional logs.

The frequency of capturing transactional logs may be higher than the frequency of capturing snapshots in a day. For example, in some embodiments, a transactional log may be captured every 30 minutes. In other embodiments, the user may define the frequency of capturing transactional logs. Further, since the source database is not quiesced (paused) for capturing the transactional log, user operations may continue while the transactional logs are being captured. Further, since the transactional logs only capture the changes in the database since the last snapshot capture, the transactional logs do not consume a lot of space. Thus, clones of the database can be created to a point in time by using a combination of transactional logs and snapshots (e.g., between two snapshot captures), or based upon available snapshots (e.g., at the point of snapshot capture).

Further, the frequency with which the snapshots and transactional logs are captured by the database system may depend upon the level of protection desired by the user. The database management system may solicit a protection schedule and definition of a Service Level Agreement ("SLA") from the user while creating the database (or registering the database). For convenience, the database management system may include built-in defaults of the protections schedule and SLA levels that the user may select from. The user may modify the defaults or define new parameters for the protection schedule and SLA. Thus, the level of protection accorded to each database associated with the database management system may be individually tailored based upon the requirements of the user. The protection schedule may allow the user to define the frequency of snapshots and transactional logs to be captured each day, and the time-period for capturing daily, weekly, monthly, and/or quarterly snapshots based upon the SLA.

In addition to provisioning and copy data management services, the database management system of the present disclosure may be configured for performing a variety of other database services, such as patching, load balancing database snapshot replication for improved scalability (particularly in a multi-cluster environment), cross availability zone database as a service, a singular database as a service for a multi-cloud environment, etc.

Further, in some embodiments, the database management system may be configured to reside on and manage databases that are located on the same cluster as the one that the database management system resides on. Such a configuration may be referred to as a single-cluster configuration. However, databases in a customer setup may have databases that span across multiple clusters. For example, in some embodiments, a database deployed in pre-production/staging, production, and backup/disaster recovery environments may be located on multiple clusters because each of those environments may have a different set of requirements (e.g., require different resources). However, a database management system that is configured to manage only those databases that are located on the same cluster as the database management system is limited in its use and operation. Providing multiple instances of the database management system to manage the databases on different clusters is complex, expensive, requires magnitudes of additional resources to deploy and manage the different database management systems, and therefore, is undesirable. In some embodiments, the database management systems across the different clusters may not even communicate with each other, thereby preventing the databases across the multiple clusters to be linked or share resources.

The present disclosure provides technical solutions that enable the database management system that is located on a particular cluster to manage databases located on other clusters. Such a configuration may be referred to as a multi-cluster configuration. Thus, a single database management system may be configured to manage multiple databases spanning across multiple clusters, thereby providing effective and convenient management of those databases.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database virtual machines") 120A and 120B (collectively referred to herein as "database virtual machines 120"), a hypervisor 125 configured to create and run the database virtual machines, and a controller/service virtual machine 130 configured to manage, route, and otherwise handle workflow requests between the various nodes of the cluster 100. Similarly, the second node 110 includes database virtual machines 135A and 135B (collectively referred to herein as "database virtual machines 135"), a hypervisor 140, and a controller/service virtual machine 145, and the third node 115 includes database virtual machines 150A and 150B (collectively referred to herein as "database virtual machines 150"), a hypervisor 155, and a controller/service virtual machine 160. The controller/service virtual machine 130, the controller/service virtual machine 145, and the controller/service virtual machine 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database virtual machines (e.g., the database virtual machines 120, the database virtual machines 135, the database virtual machines 150) are shown on each of the first node 105, the second node 110, and the third node 115, in other embodiments, the number of the database virtual machines on each of the first, second, and third nodes may vary to include other numbers of database virtual machines. Further, the first node 105, the second node 110, and the third node 115 may have the same number of database virtual machines (e.g., the database virtual machines 120, the database virtual machines 135, the database virtual machines 150) or different number of database virtual machines.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service virtual machine 130, the controller/service virtual machine 145, and the controller/service virtual machine 160, and/or the hypervisor 125, the hypervisor 140, and the hypervisor 155.

Also, although not shown, one or more of the first node 105, the second node 110, and the third node 115 may include one or more processors configured to execute instructions. The instructions may be carried out by a special purpose computer, logic circuits, or hardware circuits of the first node 105, the second node 110, and the third node 115. The processors may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors, thus, execute an instruction, meaning that they perform the operations called for by that instruction.

The processors may be operably coupled to the storage pool 170, as well as with other elements of the first node 105, the second node 110, and the third node 115 to receive, send, and process information, and to control the operations of the underlying first, second, or third node. The processors may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processors may execute instructions without first copying the instructions to the RAM. Further, the processors may include a single stand-alone processor, or a plurality of processors that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service virtual machine 130, the controller/service virtual machine 145, the controller/service virtual machine 160, and/or the hypervisor 125, the hypervisor 140, and the hypervisor 155. In some embodiments, the various storage components in the storage pool 170 may be configured as virtual disks for access by the database virtual machines 120, the database virtual machines 135, and the database virtual machines 150.

Each of the database virtual machines 120, the database virtual machines 135, the database virtual machines 150 is a software-based implementation of a computing machine. The database virtual machines 120, the database virtual machines 135, the database virtual machines 150 emulate the functionality of a physical computer. Specifically, the hardware resources, such as processor, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database virtual machines 120, the database virtual machines 135, the database virtual machines 150 that may run its own operating system and applications on the underlying physical resources just like a real computer. By encapsulating an entire machine, including CPU, memory, operating system, storage devices, and network devices, the database virtual machines 120, the database virtual machines 135, the database virtual machines 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database virtual machines 120, the database virtual machines 135, and the database virtual machines 150 with each virtual machine sharing the resources of that one physical server computer, potentially across multiple environments. For example, each of the hypervisor 125, the hypervisor 140, and the hypervisor 155 may allocate memory and other resources to the underlying virtual machines (e.g., the database virtual machines 120, the database virtual machines 135, the database virtual machine 150A, and the database virtual machine 150B) from the storage pool 170 to perform one or more functions. In some embodiments, a different type of monitor (or no monitor) may be used instead of the hypervisor 125, the hypervisor 140, and the hypervisor 155.

By running the database virtual machines 120, the database virtual machines 135, and the database virtual machines 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database virtual machines are created (e.g., installed) on the first node 105, the second node 110, and the third node 115, each of the new database virtual machines may be configured to be associated with certain hardware resources, software resources, storage resources, and other resources within the cluster 100 to allow those virtual machines to operate as intended.

The database virtual machines 120, the database virtual machines 135, the database virtual machines 150, and any newly created instances of the database virtual machines may be controlled and managed by their respective instance of the controller/service virtual machine 130, the controller/service virtual machine 145, and the controller/service virtual machine 160. The controller/service virtual machine 130, the controller/service virtual machine 145, and the controller/service virtual machine 160 are configured to communicate with each other via the network 165 to form a distributed system 195. Each of the controller/service virtual machine 130, the controller/service virtual machine 145, and the controller/service virtual machine 160 may be considered a local management system configured to manage various tasks and operations within the cluster 100. For example, in some embodiments, the local management system may perform various management related tasks on the database virtual machines 120, the database virtual machines 135, and the database virtual machines 150.

The hypervisor 125, the hypervisor 140, and the hypervisor 155 of the first node 105, the second node 110, and the third node 115, respectively, may be configured to run virtualization software, such as, ESXi from virtual machines are, AHV from Nutanix, Inc., XenServer from Citrix Systems, Inc., etc. The virtualization software on the hypervisor 125, the hypervisor 140, and the hypervisor 155 may be configured for running the database virtual machines 120, the database virtual machines 135, the database virtual machine 150A, and the database virtual machine 150B, respectively, and for managing the interactions between those virtual machines and the underlying hardware of the first node 105, the second node 110, and the third node 115. Each of the controller/service virtual machine 130, the controller/service virtual machine 145, the controller/service virtual machine 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database virtual machine (e.g., the database virtual machines 120, the database virtual machines 135, or the database virtual machines 150) may direct an input/output request to the controller/service virtual machine (e.g., the controller/service virtual machine 130, the controller/service virtual machine 145, or the controller/service virtual machine 160, respectively) on the underlying node (e.g., the first node 105, the second node 110, or the third node 115, respectively). Upon receiving the input/output request, that controller/service virtual machine may direct the input/output request to the controller/service virtual machine (e.g., one of the controller/service virtual machine 130, the controller/service virtual machine 145, or the controller/service virtual machine 160) of the leader node. In some cases, the controller/service virtual machine that receives the input/output request may itself be on the leader node, in which case, the controller/service virtual machine does not transfer the request, but rather handles the request itself.

The controller/service virtual machine of the leader node may fulfil the input/output request (and/or request another component within/outside the cluster 100 to fulfil that request). Upon fulfilling the input/output request, the controller/service virtual machine of the leader node may send a response back to the controller/service virtual machine of the node from which the request was received, which in turn may pass the response to the database virtual machine that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service virtual machine 130, the controller/service virtual machine 145, the controller/service virtual machine 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
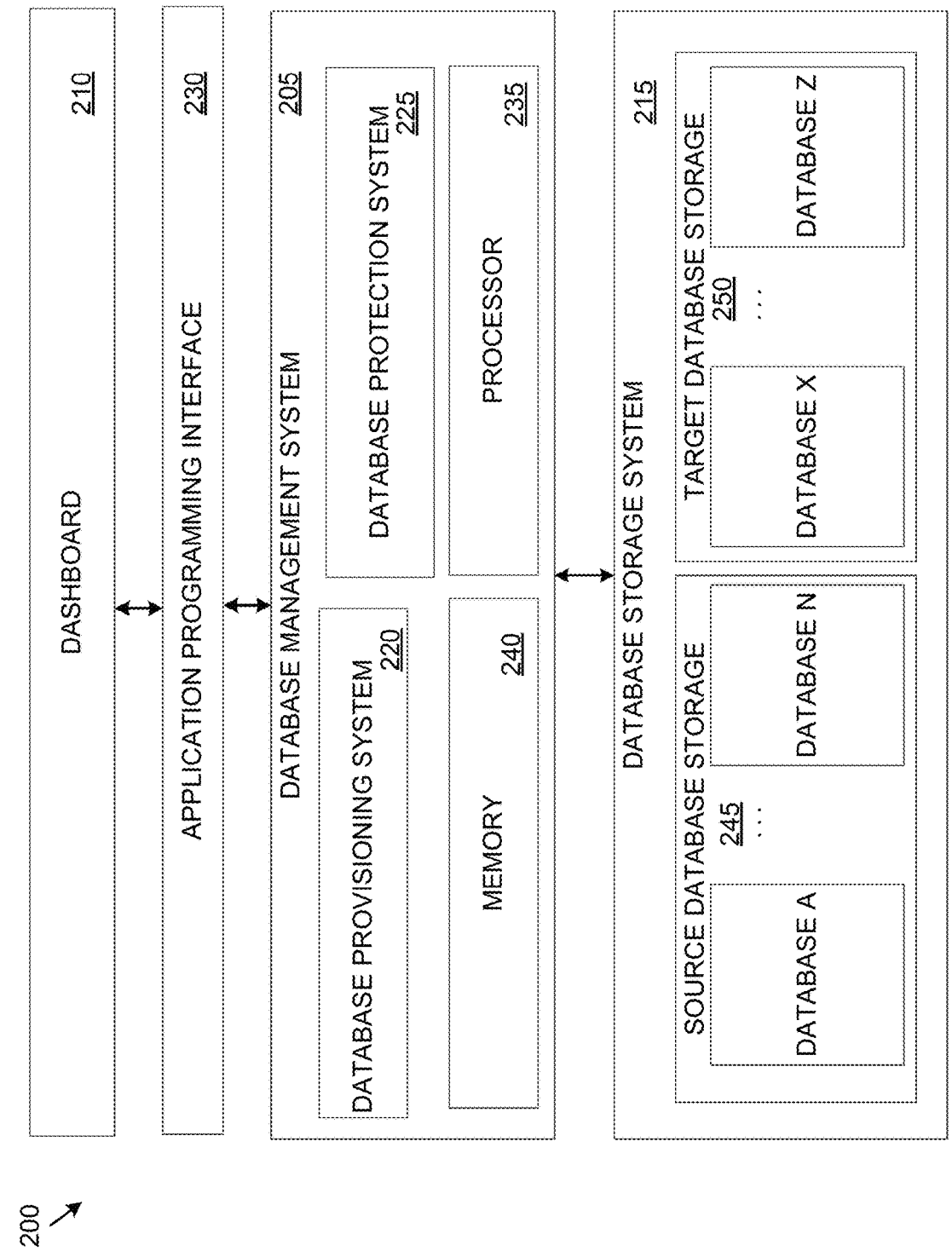
FIG. 2 is an example block diagram of a database system in the virtual computing system of FIG. 1, in accordance with some embodiments of the present disclosure.

Turning now to FIG. 2, an example block diagram of a database system 200 is shown, in accordance with some embodiments of the present disclosure. FIG. 2 is discussed in conjunction with FIG. 1. The database system 200 or portions thereof may be configured as utility software for creating and implementing database management services. The database system 200 is configured to facilitate creation/registration, protection, querying, and/or administration of the databases associated therewith. In other words, the database system 200 is configured to provide a variety of database services or database management services related to the databases associated therewith. Thus, the database system 200 includes a database management system 205 that is configured to receive input from and provide output to a user via a dashboard 210. The database management system 205 is also associated with a database storage system 215 that is configured to store one or more databases under management of the database system 200. In association with the dashboard 210 and the database storage system 215, the database management system 205 is configured to implement one or more database management services of the database system 200. For example, the database management system 205 may be configured to provide database provisioning services to create new databases and register existing databases with the database system 200 using a database provisioning system 220. The database management system 205 may also be configured to protect databases created or registered by the database provisioning system 220 via a database protection system 225, as well as provide other types of database management services. Although the database provisioning system 220 and the database protection system 225 are shown as separate components, in some embodiments, the database provisioning system and the database protection system may be combined, and the combined component may perform the operations of the individual components. Although not shown, the database management system 205 may include other or additional components that provide other or additional database management services. Thus, the database management system 205 may also be referred to herein as a "database service," "Era service," or "Era server."

The database system 200 may be installed on a database virtual machine (e.g., the database virtual machines 120, the database virtual machines 135, the database virtual machines 150 of FIG. 1). The database system 200 may be installed via the controller/service virtual machine (e.g., the controller/service virtual machine 130, the controller/service virtual machine 145, the controller/service virtual machine 160) of the node (e.g., the first node 105, the second node 110, and the third node 115) on which the database system is to be installed. For example, an administrator desiring to install the database system 200 may download a copy on write image file (e.g., qcow or qcow2 image file) on the controller/service virtual machine to define the content and structure of a disk volume to be associated with the database system 200. In some embodiments, instead of a copy on write image file, another type of disk image file, depending upon the type of underlying hypervisor, may be installed. Further, the administrator may create or one or more new database virtual machines on which the database system 200 is to reside. As part of creating the database virtual machines, the administrator may allocate a particular number of virtual central processors (vCPU) to each of the database virtual machines, define the number of cores that are desired in each vCPU, designate a specific amount of memory to each of the database virtual machines, and attach a database storage device (e.g., a virtual disk from the storage pool 170) with each of the database virtual machines. In some embodiments, at least a portion of the database storage device attached to the database system 200 may form the database storage system 215. The administrator may also create a new network interface (e.g., associate a virtual local area network (VLAN), assign an Internet Protocol ("IP") address to access the database system 200, etc.) with each of the database virtual machines. The administrator may perform additional and/or other actions to create the database virtual machines on which the database system 200 resides upon creation and installation of the disk image file.

In some embodiments, the database virtual machines on which the database system 200 resides may all be located on a single node (e.g., one of the first node 105, the second node 110, and the third node 115). In other embodiments, the database virtual machines on which the database system 200 resides may be spread across multiple nodes within a single cluster, or amongst multiple clusters. When spread across multiple clusters, each of the associated multiple clusters may be configured to at least indirectly communicate with one another to facilitate operation of the database system 200. Upon installing the database system 200, a user (e.g., the administrator or other user authorized to access the database system) may access the dashboard 210. The dashboard 210, thus, forms the front end of the database system 200 and the database management system 205 and the database storage system 215 form the backend of the database system.

The database system 200 may be accessed via a computing device associated with the virtual computing system (e.g., of FIG. 1). In other embodiments, instead of or in addition to being accessible via a particular computing device, the database system 200 or at least portions thereof may be hosted on a cloud service and may be accessed via the cloud. In some embodiments, the database system 200 may additionally or alternatively be configured as a mobile application suitable for access from a mobile computing device (e.g., a mobile phone). In some embodiments, the database system 200 and particularly the dashboard 210 may be accessed via an Application Programming Interface ("API") 230. To access the dashboard 210 via the API 230, a user may use designated devices such as laptops, desktops, tablets, mobile devices, other handheld or portable devices, and/or other types of computing devices that are configured to access the API. These devices may be different from the computing device on which the database system 200 is installed.

In some embodiments and when the dashboard 210 is configured for access via the API 230, the user may access the dashboard via a web browser and upon entering a uniform resource locator ("URL") for the API such as the IP address or other indicator of the database system 200 or other web address. Using the API 230 and the dashboard 210, the users may then send instructions to the database management system 205 and receive information back from the database management system. In some embodiments, the API 230 may be a representational state transfer ("REST") type of API. In other embodiments, the API 230 may be any other type of web or other type of API (e.g., ASP.NET) built using any of a variety of technologies, such as Java, .Net, etc., that is capable of accessing the database management system 205 and facilitating communication between the users and the database management system. In some embodiments, the API 230 may be configured to facilitate communication via a hypertext transfer protocol ("HTTP") or hypertext transfer protocol secure ("HTTPS") type request. The API 230 may receive an HTTP/HTTPS request and send an HTTP/HTTPS response back. In other embodiments, the API 230 may be configured to facilitate communication using other or additional types of communication protocols. In other embodiments, the database system 200 may be configured for access in other ways.

The dashboard 210 provides a user interface that facilitates human-computer interaction between the users and the database management system 205. The dashboard 210 is configured to receive user inputs from the users via a graphical user interface ("GUI") and transmit those user inputs to the database management system 205. The dashboard 210 is also configured to receive outputs/information from the database management system 205 and present those outputs/information to the users via the GUI of the management system. The GUI may present a variety of graphical icons, windows, visual indicators, menus, visual widgets, and other indicia to facilitate user interaction. In other embodiments, the dashboard 210 may be configured as other types of user interfaces, including for example, text-based user interfaces and other man-machine interfaces. Thus, the dashboard 210 may be configured in a variety of ways.

Further, the dashboard 210 may be configured to receive user inputs in a variety of ways. For example, the dashboard 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the database system 200. The dashboard 210 may also be configured to present outputs/information to the users in a variety of ways. For example, the dashboard 210 may be configured to present information to external systems such as users, memory, printers, speakers, etc. Therefore, although not shown, dashboard 210 may be associated with a variety of hardware, software, firmware components, or combinations thereof. Generally speaking, the dashboard 210 may be associated with any type of hardware, software, and/or firmware component that enables the database management system 205 to perform the functions described herein.

Thus, the dashboard receives a user request (e.g., an input) from the user and transmits that user request to the database management system 205. In some embodiments, the user request may be to request a database management service. For example, in some embodiments, the user request may be to request a database provisioning service. In response to the user request for a database provisioning service, the database management system 205 may activate the database provisioning system 220.

The database management system 205, including the database provisioning system 220 and the database protection system 225 may be configured as, and/or operate in association with, hardware, software, firmware, or a combination thereof. Specifically, the database management system 205 may include a processor 235 configured to execute instructions for implementing the database management services of the database system 200. In some embodiments, each of the database provisioning system 220 and the database protection system 225 may have their own separate instance of the processor 235. The processor 235 may be implemented in hardware, firmware, software, or any combination thereof. "Executing an instruction" means that the processor 235 performs the operations called for by that instruction. The processor 235 may retrieve a set of instructions from a memory for execution. For example, in some embodiments, the processor 235 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. In some embodiments, the processor 235 may be configured to execute instructions without first copying those instructions to the RAM. The processor 235 may be a special purpose computer, and include logic circuits, hardware circuits, etc. to carry out the instructions. The processor 235 may include a single stand-alone processor, or a plurality of processors that use the same or different processing technology. The instructions may be written using one or more programming language, scripting language, assembly language, etc.

The database management system 205 may also include a memory 240. The memory 240 may be provisioned from or be associated with the storage pool 170. In some embodiments, the memory 240 may be separate from the storage pool 170. The memory 240 may be any of a variety of volatile and/or non-volatile memories that may be considered suitable for use with the database management system 205. In some embodiments, the memory 240 may be configured to store the instructions that are used by the processor 235. Further, although not shown, in some embodiments, the database provisioning system 220 and the database protection system 225 may each, additionally or alternatively, have their own dedicated memory. In some embodiments, the memory 240 may be configured to store metadata associated with managing the various databases in the database system 200. Thus, in some embodiments, the memory 240 may be a repository for metadata and other types of data that may be needed to provide the database management services (the terms database management services, database services, and the like are used interchangeably herein).

Further, the database management system 205 may be configured to handle a variety of database engine types. For example, in some embodiments, the database management system 205 may be configured to manage PostgreSQL, Oracle, Microsoft SQL server, and MySQL database engine types. In other embodiments, the database management system 205 may be configured to manage other or additional database engine types. Each database that is provisioned (e.g., created or registered) within the database system 200 may be of a particular "database engine type." The database engine type may identify the type of database management system (e.g., Oracle, PostgreSQL, etc.) of a particular database. By virtue of creating or registering a database with a particular database engine type, that database is managed in accordance with the rules of that database engine type. Thus, the database management system 205 is configured to be operable with and manage databases associated with a variety of database engine types.

It is to be understood that only some components of the database management system 205 are shown and discussed herein. In other embodiments, the database management system 205 may also include other components that are considered necessary or desirable in implementing the various database management services discussed herein. Similarly, the database provisioning system 220 and the database protection system 225 may have components that are considered necessary or desirable in implementing the various database management services discussed herein.

Referring still to FIG. 2, the database storage system 215 is configured to store one or more databases that are provisioned in the database system 200. The database storage system 215 may include a source database storage 245 and a target database storage 250. The source database storage 245 may be configured to store the original or recovered instances of the databases (also referred to herein as source databases) that are created within, registered with, or recovered in, the database system 200. The target database storage 250 may be configured to store the clones of the source databases (also referred to herein as cloned databases). In some embodiments, the source database storage 245 and the target database storage 250 may be provisioned from the storage pool 170 and may include virtual disk storage that is associated with the database virtual machines (e.g., the database virtual machines 120, the database virtual machines 135, the database virtual machines 150) on which the database system 200, the source databases, and the cloned databases reside. For example, in some embodiments, the source database storage 245 may be associated with one or more source database virtual machines (referred to herein as source database virtual machines or source database server virtual machines) and the source databases stored within the source database storage may be stored within the virtual disks associated with the source database virtual machines. Similarly, in some embodiments, the target database storage 250 may be associated with one or more database virtual machines (referred to herein as target database virtual machines or target database server virtual machines) and the databases stored within the target database storage may be stored within the virtual disks associated with the target database virtual machines. In some embodiments, one or more source databases and/or one or more cloned databases may be stored on a cloud. In some embodiments, each source database virtual machine may be configured to store one or more source databases and each target database virtual machine may be configured to store one or more target databases. In other embodiments, the source database storage 245 and the target database storage 250 may additionally or alternatively be provisioned from other types of storage associated with the database system 200.

Further, depending upon the size of a particular database and the size of the storage space associated with a particular source database virtual machine, a source database may be stored in its entirety on a single source database virtual machine or may span multiple source database virtual machines. Further, as the size of that source database increases, the source database may be moved to another source database virtual machine, may be stored onto multiple source database virtual machines, and/or additional storage space may be provisioned to the source database virtual machines to house the increased size of the source database. Similarly, depending upon the size of a cloned database and the size of the storage space associated with a particular target database virtual machine, the cloned database may be stored on a single or multiple target database virtual machines. Further, as the size of the cloned database increases, the cloned database may be moved to another target database virtual machine of appropriate size, may be divided amongst multiple target database virtual machines, and/or additional storage space may be provisioned to the target database virtual machine. Thus, the database storage system 215 is structured with the flexibility to expand and adapt to accommodate databases of various sizes.

Additionally, in some embodiments, the databases of the source database storage 245 and/or the target database storage 250 may be stored on a single cluster or span across multiple clusters. For example, in some embodiments, the databases of the source database storage 245 may span across a first set of clusters and the databases of the target database storage 250 may span across a second set of clusters. In some embodiments, the source databases and the cloned databases may be stored on separate designated clusters. In other embodiments, a cluster may be configured to store both source and cloned databases.

Figure 3:
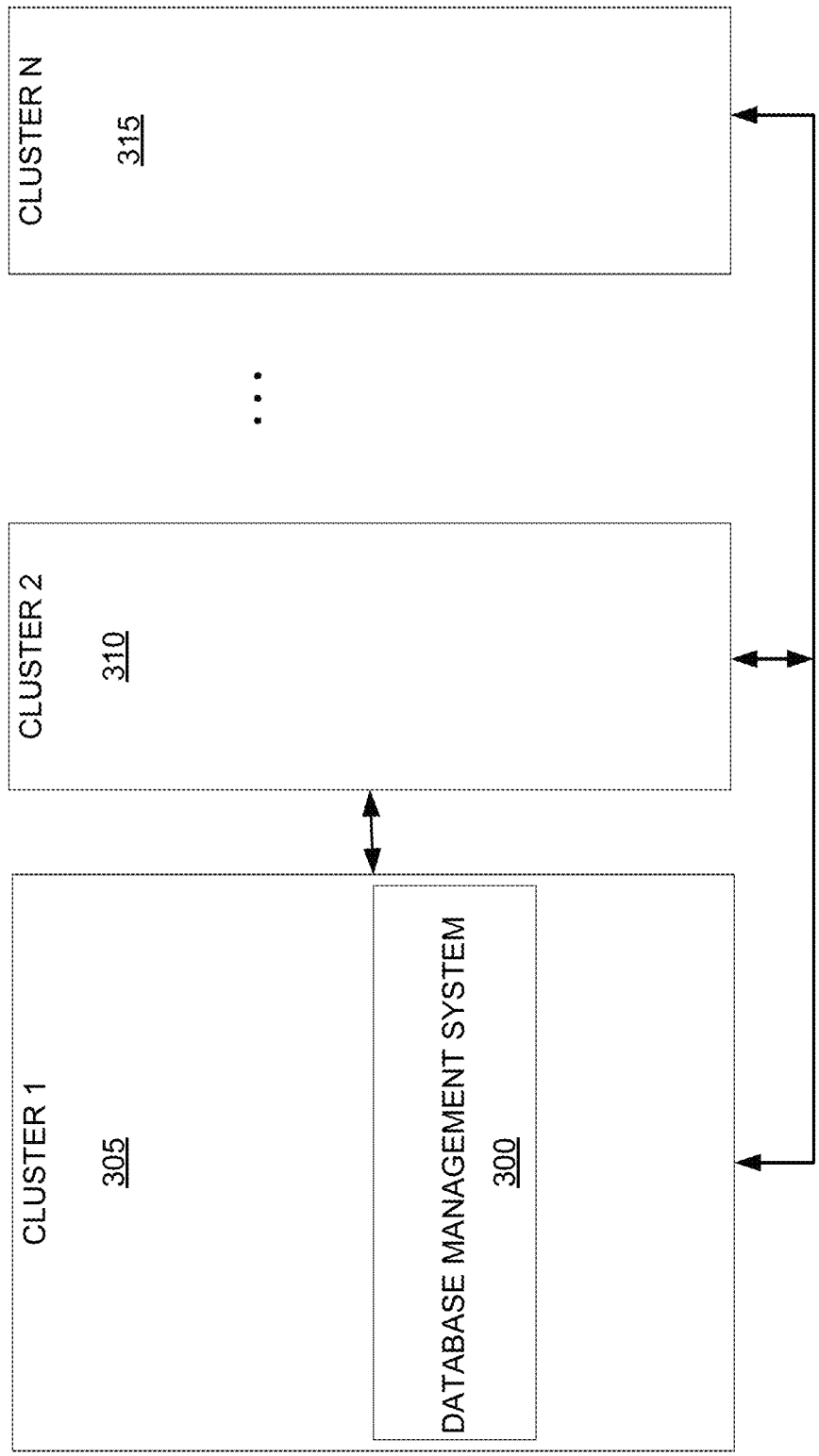
FIG. 3 is an example block diagram showing a multi-cluster configuration of a database management system of the database system of FIG. 2, in accordance with some embodiments of the present disclosure.

Turning to FIG. 3, an example block diagram showing a multi-cluster configuration of a database management system 300 is shown, in accordance with some embodiments of the present disclosure. Although not shown, the database management system 300 is intended to include or be associated with the elements discussed above in FIG. 2. For example, the database management system 300 may communicate via an API with a dashboard and be associated with a database storage system, as discussed above in FIG. 2. The database management system 300 may also be configured to provide various database management services.

In some embodiments, the database management system 300 may be configured to manage databases spread across multiple clusters. Thus, for example, the database management system 300 may be configured to manage databases across clusters 305-315. Each of the clusters 305-315 may be similar to the cluster 100. Although only three clusters (e.g., the clusters 305-315) are shown in FIG. 3, in other embodiments, the database management system 300 may be configured to manage additional or fewer clusters. In some embodiments, the database management system 300 may reside on one cluster (e.g., the cluster 305). In some embodiments, the database management system 300 may include an agent installed on each of the clusters 310 and 315 that facilitates communication between the database management system residing on the cluster 305 and the databases residing on the clusters 305, 310, and 315.

Figure 4:
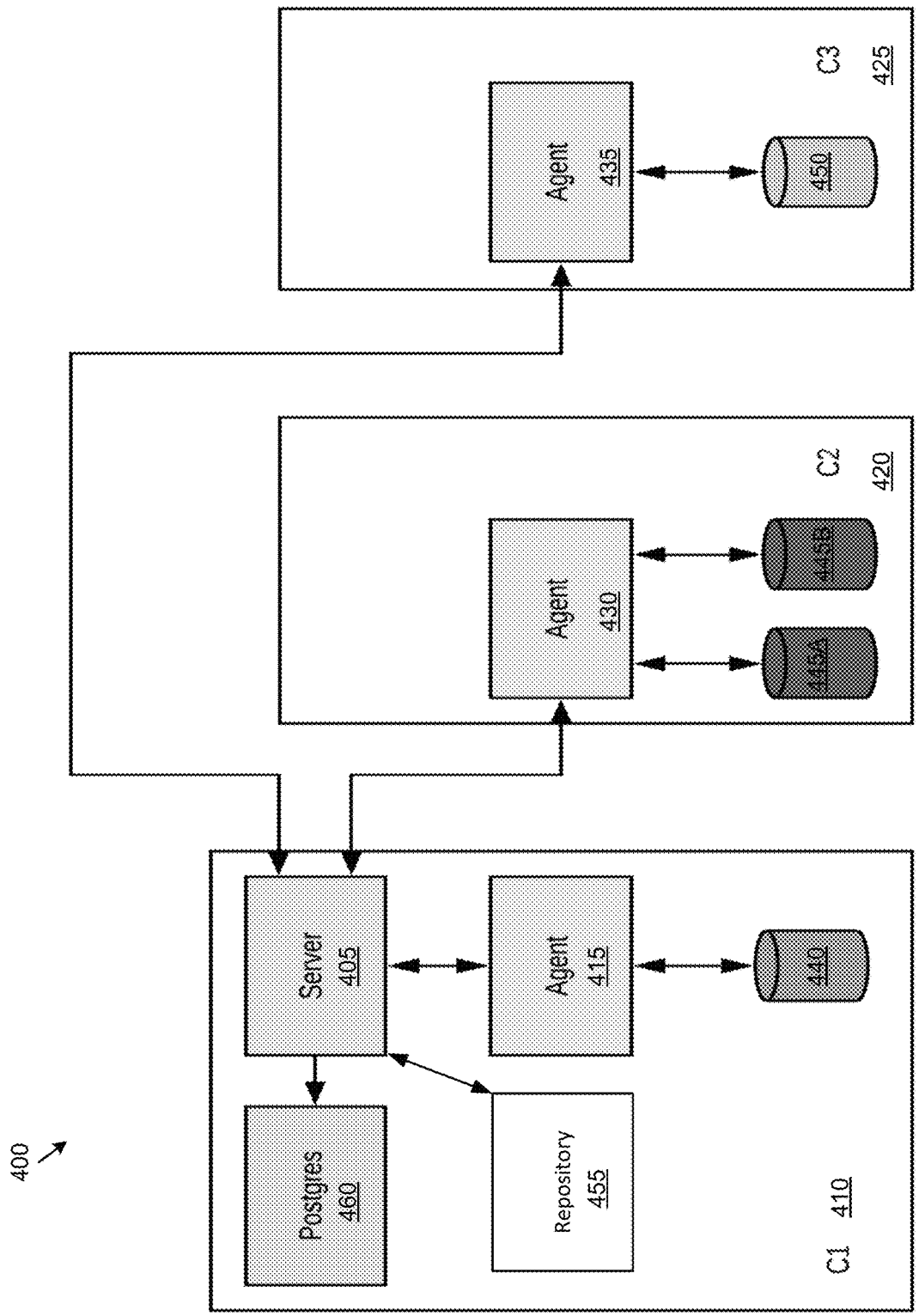
FIG. 4 is an example block diagram showing additional details of the database management system in the multi-cluster configuration of FIG. 3, in accordance with some embodiments of the present disclosure.

Referring now to FIG. 4, additional details of a database management system 400 are shown, in accordance with some embodiments of the present disclosure. The database management system 400 is similar to the database management systems 205, 300. As indicated above, the database management system may be configured to manage databases stored across multiple clusters. To manage databases spanning multiple clusters, the database management system 400 may be implemented in a multi-cluster configuration (e.g., a master-slave/leader-follower configuration or a multi-master configuration). For example, in some embodiments, the database management system 400 may include a server 405 that resides on a cluster 410. The database management system 400 may also include a plurality of agents that reside on each cluster that the database management system is intended to manage. For example, and as shown in FIG. 4, the cluster 410 may include an agent 415 that communicates with the server 405. Similarly, clusters 420 and 425 may each have an agent 430 and 435, respectively, that communicates with the server 405. Although only three clusters are shown in FIG. 4, it is to be understood that the server 405 may be configured to manage greater than or fewer than three clusters. Each cluster that is intended to be managed by the server 405 may have an agent installed thereon to facilitate communication between the server and the cluster on which that particular agent is installed.

The agent 415 may serve as an intermediary between the server 405 and database 440 on the cluster 410. The agent 430 may serve as an intermediary between the server 405 and databases 445A and 445B stored on the cluster 420, while the agent 435 may serve as an intermediary between the server and database 450 stored on the cluster 425. Although the databases 440 and 450 are shown to include a single database and the databases 445A and 445B are shown to include two databases, the number of databases that each of the agents 415, 430, 435 may be associated with may vary. Further, in some embodiments, one or more of the databases 440-450 may be different databases. In other embodiments, one or more of the databases 440-450 may be copies or clones of each other. For example, in some embodiments, the database 450 may be a copy of the database 440 (e.g., to provide high availability). In yet other embodiments, a particular database may be spread across multiple clusters. For example, in some embodiments, the databases 440 and 450 may each be a portion of a large database that is split across multiple clusters. The databases 440-450 may be part of the database storage system 215 and may be configured as described above in FIG. 2.

A multi-cluster configuration may also include a repository 455 (e.g., a storage for storing metadata and other data needed to manage the various databases (e.g., the databases 440, 445, 450) and the agents 415, 430, 435). Thus, a multi-cluster configuration may include a repository (e.g., the repository 455), a server (e.g., the server 405), API (e.g., the API 230—not shown in FIG. 4), a common driver (e.g., the agents 415, 430, 435), and database engines and associated drivers 460. Although the data engine type shown in FIG. 4 is Postgres, in other embodiments, other database engine types may be used. Generally speaking, the database management system 400 may be configured to manage various database engine types. Thus, for each database engine type handled by the database management system 400, associated drivers (e.g., similar to the drivers 460) may be provided on the cluster 410 to provide the protocols for managing databases of that database engine type.

The server 405 may be located on a virtual machine on the cluster 410 and the common drivers (e.g., the agents) may be distributed across the various clusters such that the common drivers are able to interact independently with the server. The server 405 may host the API (e.g., the API 230) and interacts with the repository 455. Although the repository 455 is located on the cluster 410, in some embodiments, the repository may be located on the clusters 420 or 425, and the server 405 may access the repository through the agents 430 and 435, respectively, located om those clusters. The server 405 may be configured as software, hardware, firmware, or a combination thereof. Although not shown, the server 405 may be associated with a processor (e.g., the processor 235) and a memory (e.g., the memory 240) for performing the functions described herein.

In some embodiments, the server 405 may include two components: (1) an application server (e.g., Apache Tomcat) that serves the API (e.g., the API 230) and the GUI (e.g., the dashboard 210), and (2) the repository 455 to store "state" information of the databases 440, 445, and 450, as well as any other information that may be needed in managing the agents 415, 430, 435 and the databases 440-450. In some embodiments, the repository may be called the "data-tier" and the application server may be called a "mid-tier."

In some embodiments, the agents 415, 430, and 435 may be configured as software, hardware, firmware, or a combination thereof. Each of the agents 415, 430, and 435 may, in some embodiments, be an autonomous software program that is configured for performing one or more specific and approved operations. The agents 415, 430, 435 may be associated with resources (e.g., CPU, memory, etc.) on the cluster that they reside on. In some embodiments, the agents 415, 430, and 435 may be installed on a virtual machine of the cluster that they reside on. For example, the agent 415 may reside on a virtual machine on the cluster 410. In some embodiments, the agent 415 may reside on a virtual machine that is different from the virtual machine on which the server 405 resides. In some embodiments, the agents 415, 430, 435 may be configured to perform operations under control by the server 405. Thus, the agents 415, 430, 435 may be mostly "stateless."

The agents 415, 430, 435 interact with the server 405 to pick up work and execute. In other words, the server 405 sends requests or instructions to the agents 415, 430, 435 for operations or tasks to be performed by those agents. Upon receiving the instructions from the server 405, a respective one of the agents 415, 430, 435 that receives those instructions may perform the requested tasks or operations by calling an appropriate script based on the type of work needed. For example, to create a clone of a database, the agent may invoke a cloning script. As another example, the agents 415, 430, 435 may also be requested to gather transactional logs (also referred to herein as logs or log drives) for replicating and/or protecting databases. Upon completing their assigned task(s), the agents 415, 430, 435 may respond back to the server 405 indicating that the tasks or operations are completed and wait to receive the next task or operation from the server. Example operations that each of the agents 415, 430, 435 may perform may include database provisioning, database server provisioning (e.g., creating a database server virtual machine), database cloning, database server cloning (e.g., cloning a database server virtual machine), registering a database, registering a database server virtual machine, copy log operations, resiliency and curation operations, profile (e.g., network, software, compute, etc.) creation, capturing snapshots, cleanup operations, etc.

In some embodiments, each of the agents 415, 430, 435 may have a process running thereon that may regularly (e.g., every 10 seconds) poll the server 405 for any tasks or operations to be performed. If the server 405 determines that a task or operation is needed, the server may send instructions to that polling agent. In some embodiments, the agents 415, 430, 435 may poll the server 405 by calling an API on the server. In other embodiments, the agents 415, 430, 435 may use other mechanisms to poll the server 405.

To create a multi-cluster configuration of the database management system 400 as shown in FIG. 4, a non-multi-cluster or single-cluster configuration of the database management system may be converted into the multi-cluster configuration. In some embodiments, the starting point of a multi-cluster configuration may, thus, be a single-cluster configuration in which the database management system is configured to only manage databases on that cluster. To convert the single-cluster configuration into a multi-cluster configuration, the server of the single-cluster configuration is split into the server 405 and the agents 415, 430, 435. The conversion of a single-cluster configuration into a multi-cluster configuration is discussed below in FIGS. 5-6.

As indicated above, in some embodiments, the multi-cluster configuration may be configured either as a leader-follower model or a multi-master model. In a leader-follower model, the server of a single-cluster architecture may be split into the server 405 and the agent 415. Upon splitting, additional agents on additional clusters may be deployed. The server 405 interacts with the repository 455, either directly or through the agent 415. The server 405 may be considered "stateful." The agent 415 (as well as the agents 430, 435) may be considered "stateless," as noted above, and may be configured to run the driver code, as discussed above. Thus, in a leader-follower model, a single server (e.g., the server 405) serves as the leader and each of the agents 415, 430, 435 serves as a follower. The leader sends requests to the followers and the followers perform operations to satisfy the requests. Thus, the followers operate under control of the leader. All user requests are directed to the server 405 and the server then allocates the requests to an appropriate one or more of the agents 415, 430, 435. For example, to service a request from the databases 445A, the user may send a request to the server 405, which may then forward that request to the agent 430. The agent 430 may fulfil that request from the databases 445A and send a response back to the server 405. The server 405 may then respond back to the user.

In a multi-master model, multiple instances of the server 405 may be provided. For example, in some embodiments, an instance of the server 405 may be run on each cluster (e.g., the clusters 410, 420, 425) that is part of the multi-cluster configuration. Each instance of the server may be associated with an agent. For example, each of the clusters 410, 420, and 425 may be configured similar to the cluster 410 having the server 405, the agent 415, the repository 455, and the drivers 460. The server on each cluster may control the agent located on that same cluster. In some embodiments, a leader server may be selected from all the servers. In some embodiments, a single instance of the repository 455 may be provided and controlled by the leader server. To service requests, in some embodiments, a user may send a request to the server located on the cluster from which the request is to be serviced. In other embodiments, a user may send a request to the leader server and the leader server may forward the request to the server on the cluster from which the request is to be serviced.

Figure 5:
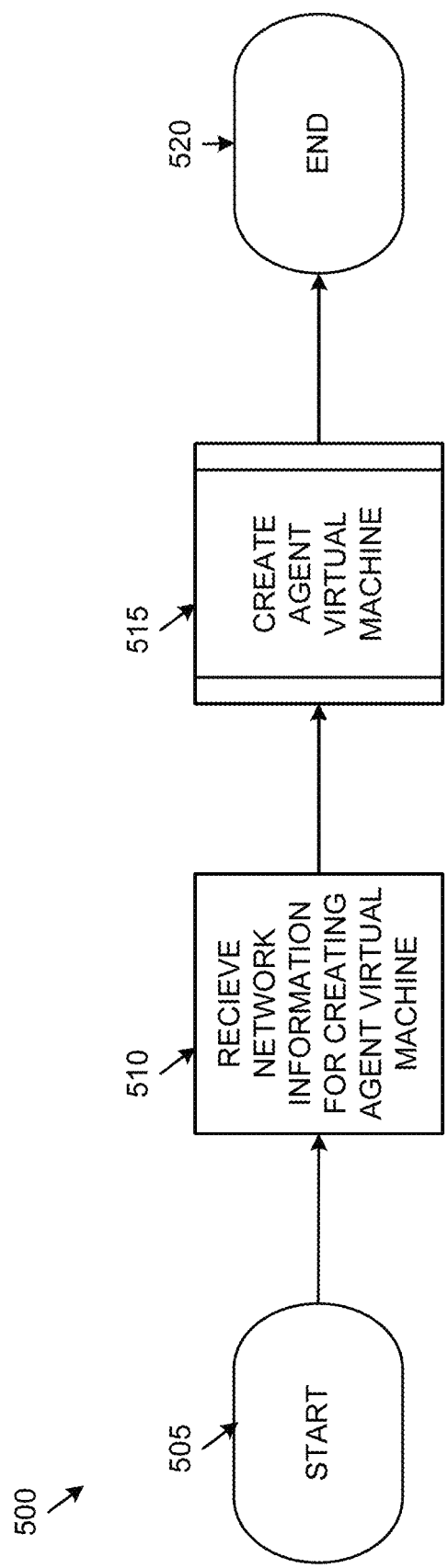
FIG. 5 is an example flowchart outlining operations for enabling the multi-cluster configuration of FIG. 4, in accordance with some embodiments of the present disclosure.

Turning now to FIG. 5, an example flowchart outlining operations of a process 500 are shown, in accordance with some embodiments of the present disclosure. The process 500 may include other or additional operations depending upon the particular embodiment. The process 500 may be configured to enable a multi-cluster configuration of FIG. 4 above. The process 500 may be implemented by the server 405 in the single-cluster configuration.

In some embodiments, the process 500 may start from a single-cluster configuration. The server 405 in a single cluster architecture may be configured to manage the databases (e.g., the database 440) located on the cluster 410 only. In a single-cluster configuration, the server 405 and the agent 415 are co-located on a single virtual machine. From that initial single-cluster configuration, the multi-cluster configuration may be enabled to allow the server 405 to manage databases across multiple clusters (e.g., manage the databases 445A and 445B on the cluster 420 and the database 450 on the cluster 425). To enable the multi-cluster configuration, the server 405 and the agent 415 are split to be located on separate virtual machines of the same cluster (e.g., the cluster 410). In some embodiments, the virtual machine on which the server 405 upon splitting resides may be referred to as a server virtual machine and the virtual machine on which the agent 415 resides may be referred to as an agent virtual machine.

To enable the multi-cluster configuration, a user may provide network information (e.g., IP address, VLAN, Domain Name System (DNS), gateway, subnet mask, etc.) for creating a new agent virtual machine on the cluster 410 for the agent 415. Specifically, to create the agent virtual machine for hosting the agent 415 upon splitting, the server 405 in the single-cluster configuration needs to know which network to use. In some embodiments, the server 405 in the single cluster configuration may be configured with default network information to use in establishing an agent virtual machine on the cluster 410 for the agent 415. In other embodiments, a user may provide the network information. Accordingly, upon starting at operation 505, the server 405 in the single-cluster configuration receives the network information at operation 510. In some embodiments, a user inputs the network information by way of the dashboard 210 and the API 230. In some embodiments, the server 405 in the single-cluster configuration may request additional information (e.g., name of the agent virtual machine, etc.) for creating the agent virtual machine.

Upon receiving the network information (and any other information), the server 405 in the single-cluster configuration creates an agent virtual machine on the cluster 410, at operation 515, for the agent 415. The operation 515 is discussed in greater detail in FIG. 6. The process 500 ends at operation 520. At the end of the process 500, the server 405 in the single-cluster configuration continues to be in a single-cluster configuration with the server and the agent 415 being co-located on a single virtual machine on the cluster 410. Further, no additional clusters are registered with the server 405.

Figure 6:
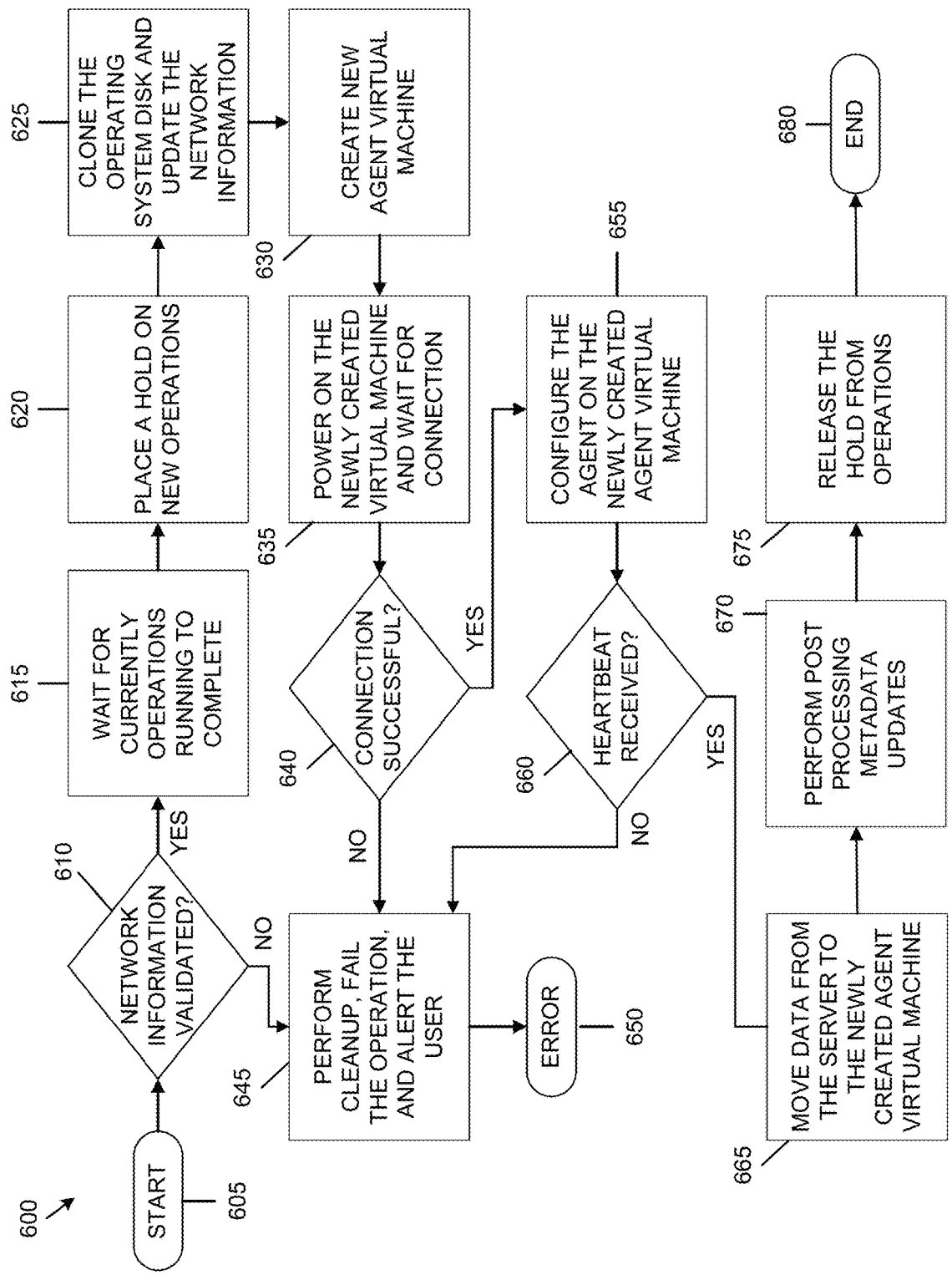
FIG. 6 is an example flowchart outlining additional operations for enabling the multi-cluster configuration of FIG. 4, in accordance with some embodiments of the present disclosure.

Turning now to FIG. 6, an example flowchart outlining operations of a process 600 is shown, in accordance with some embodiments of the present disclosure. The process 600 may include other or additional operations depending upon the particular embodiment. The process 600 may be implemented by the server 405 in the single-cluster configuration to split the co-located server/agent into server and agent located on separate virtual machines. The process 600 describes the operation 515 in greater detail. It is to be understood that "splitting" the server/agent means that the server and the agent are split from being co-located on the same virtual machine before the splitting to being located on separate virtual machines after the "splitting" on the same cluster. In other words, a new virtual machine is created on the cluster 410 and the agent 415 (or the server 405) is migrated to that created virtual machine. In some embodiments, the server 405 may maintain metadata about the various agents that the server is associated with. By reviewing the metadata, the sever 405 may determine if an agent resides on a particular cluster, and the virtual machine on which the agent resides on.

Thus, the process 600 starts at operation 605 upon receiving the network information from the operation 510. At operation 610, the server 405 in the single-cluster configuration validates the network information. In some embodiments, the server 405 in the single-cluster configuration validates the network information by verifying that the network information received from the process 500 is accurate. For example, if the network information provides a VLAN that is not associated with the cluster 410, the server 405 in the single-cluster configuration may determine that the network information is inaccurate. In some embodiments, the server 405 in the single-cluster configuration may verify the network information in various ways. For example, in some embodiments, the server 405 in the single-cluster configuration may access one or more logs or files storing network information and match the network information received from the user with the information in the logs or files. In other embodiments, the server 405 in the single-cluster configuration may use other or additional mechanisms to verify the network information.

In some embodiments, the server 405 in the single-cluster configuration may also determine whether the cluster 410 has sufficient resources (e.g., CPU, memory, etc.) to create a new agent virtual machine thereon. In some embodiments, the server 405 in the single-cluster configuration may perform other or additional checks before creating the agent virtual machine on the cluster 410. If the server 405 in the single-cluster configuration determines that the cluster 410 has sufficient resources and the network information is accurate (and completes any other checks), the server in the single-cluster configuration waits for existing or currently running operations on the server to complete at operation 615. At operation 620, upon all currently running operations being completed, the server 405 in the single-cluster configuration puts a hold on any new operations until the process 600 is completed. In other words, the server 405 in the single-cluster configuration stops accepting any new requests (or continues to accept new requests but puts the new requests in a waiting queue to be executed after the hold is released). The hold may apply to any operation that begins on the server 405 in the single-cluster configuration and/or any log catchup operations.

At operation 625, upon putting a hold on new operations, the server 405 in the single-cluster configuration clones the operating system disk of the virtual machine on which the server in the single-cluster configuration resides with the agent 415. The server 405 in the single-cluster configuration may also use offline disk processing to update the network information in an operating system configuration file associated with the cloned operating system disk for the new agent virtual machine to be created with the network information received in FIG. 5. In some embodiments, the server 405 in the single-cluster configuration may update the operating system configuration file (e.g., /etc/sysconfig/network-scripts/ifcfg-eth0) with the networking information (and/or other information) before the agent virtual machine may be powered on.

Upon cloning the operating system disk and updating the network information in the operating system configuration file associated with the cloned operating system disk, the server 405 in the single-cluster configuration creates a new agent virtual machine on the cluster 410 at operation 630. The newly created agent virtual machine may be associated with the cloned operating system disk file (and the operating system configuration file having the updated network information) of the operation 625. The newly created agent virtual machine may be allocated a compute size (e.g., CPU, memory, etc.). In some embodiments, the compute size may be based upon a lowest amount of CPU and memory resources that may be needed to properly operate the agent on the agent virtual machine while minimizing resource consumption. In some embodiments, a default compute size may be allocated to the agent virtual machine. In other embodiments, the server 405 in the single-cluster configuration may receive the compute size as an input from the user.

At operation 635, the newly created agent virtual machine is powered on and the server 405 in the single-cluster configuration waits for the agent virtual machine to come online and establish a connection with the server. For example, in some embodiments, the server 405 in the single-cluster configuration may wait until the IP address of the newly created agent virtual machine becomes visible to the server. In some embodiments, the server 405 in the single-cluster configuration may wait for a predetermined period of time to see if the IP address of the newly created agent virtual machine becomes visible at operation 640. If the server 405 in the single-cluster configuration does not see the IP address of the newly created agent virtual machine within the predetermined period of time, the server may determine that the creation of the agent virtual machine has failed and the process 600 proceeds to operation 645.

The operation 645 is also reached from the operation 610 if the server 405 in the single-cluster configuration fails to either validate the network information (or any other information being validated) or determines that the cluster does not have sufficient resources to create the agent virtual machine. At the operation 645, the server 405 in the single-cluster configuration deletes the network information received from the process 500 and any other information received for splitting the server and the agent 415 and issues an error notification to the user at operation 650 indicating that the enabling of the multi-cluster configuration has failed. In some embodiments, the server 405 in the single-cluster configuration may also release the hold of the operation 620 at the operation 650.

On the other hand, upon successfully powering on the agent virtual machine and establishing connection with the agent virtual machine (e.g., the IP address of the agent virtual machine becomes visible to the server of the single cluster architecture) at the operation 640, the server 405 in the single-cluster configuration remotely runs scripts to configure/install the agent 415 on the newly created agent virtual machine at operation 655. For example, in some embodiments, the server 405 in the single-cluster configuration may run scripts on the agent virtual machine to allow the agent 415 to continue performing the same functions that the agent was performing before the split. In some embodiments, each agent may be assigned a unique ID (e.g., UUID). Thus, the server 405 in the single-cluster configuration may assign the agent 415 a UUID and store that UUID in a configuration file associated with the agent, as well as in the repository 455. The UUID may be registered with the server 405 in the single-cluster configuration (e.g., by storing the UUID in the repository 455) to allow the server to communicate with the agent 415. After the operation 655, the agent virtual machine has an agent installed thereon.

Upon running the scripts, at operation 660, the server 405 in the single-cluster configuration verifies that the agent 415 on the newly created agent virtual machine is able to communicate with the server (e.g., a daemon on the agent virtual machine is sending a heartbeat). If the server 405 in the single-cluster configuration does not detect a heartbeat at the operation 660, the process 600 proceeds to the operation 645 where an error is issued at the operation 650. If the server 405 in the single-cluster configuration receives a heartbeat from the agent virtual machine at the operation 660, the process 600 proceeds to operation 665. At the operation 665, the server 405 in the single-cluster configuration moves all the log drives (e.g., data) from the virtual machine (e.g., from a storage device of the virtual machine) on which the server is located to a storage device associated with the new agent virtual machine created at the operation 630. For example, in some embodiments, the server 405 in the single-cluster configuration may unmount and detach a volume group (e.g., a virtual disk that may be part of the volume group) from the virtual machine associated with the server and attach that volume group with the newly created agent virtual machine.

In some embodiments, the server 405 in the single-cluster configuration may need to update (e.g., to remove the volume group and other information) the operating system configuration file (e.g., /etc/fstab/) associated with the operating system of the virtual machine on which the server is located. In some embodiments, the server 405 in the single-cluster configuration may also need to update the operating system configuration file of the agent virtual machine (e.g., to add the volume group and the other information deleted from the operating system configuration file of the server). The server 405 in the single-cluster configuration may move or provide any other data that the agent 415 on the newly created virtual machine may need for proper operation.

At operation 670, the server 405 in the single-cluster configuration may perform post-processing metadata updates. In other words, the server 405 in the single-cluster configuration may update its metadata in the repository 455 such that the agent 415 on the newly created agent virtual machine is used for all future and scheduled operations. In other words, the server 405 in the single-cluster configuration may disable the agent that was co-located with the server at the start of the process 600. The server 405 may perform any other operations that may be needed or considered desirable in ensuring a proper operation of the agent 415, the server, as well as the communication between the server and the agent. Upon completing the operation 670, the server 405 and the agent 415 may be considered to be located on separate virtual machines on the cluster 410. At operation 675, the server 405 may release the hold that was placed at the operation 620 to resume normal operation and the process 600 ends at operation 680.

Upon completing the process 600, the server 405 in the single-cluster configuration is transitioned into a multi-cluster configuration. However, the multi-cluster configuration at the end of the process 600 includes a single cluster (e.g., the cluster 410) on which the server 405 and the agent 415 reside. Upon completing the process 600, in some embodiments, additional clusters may be registered with the server 405, as discussed in FIGS. 7 and 8 below.

Figure 7:
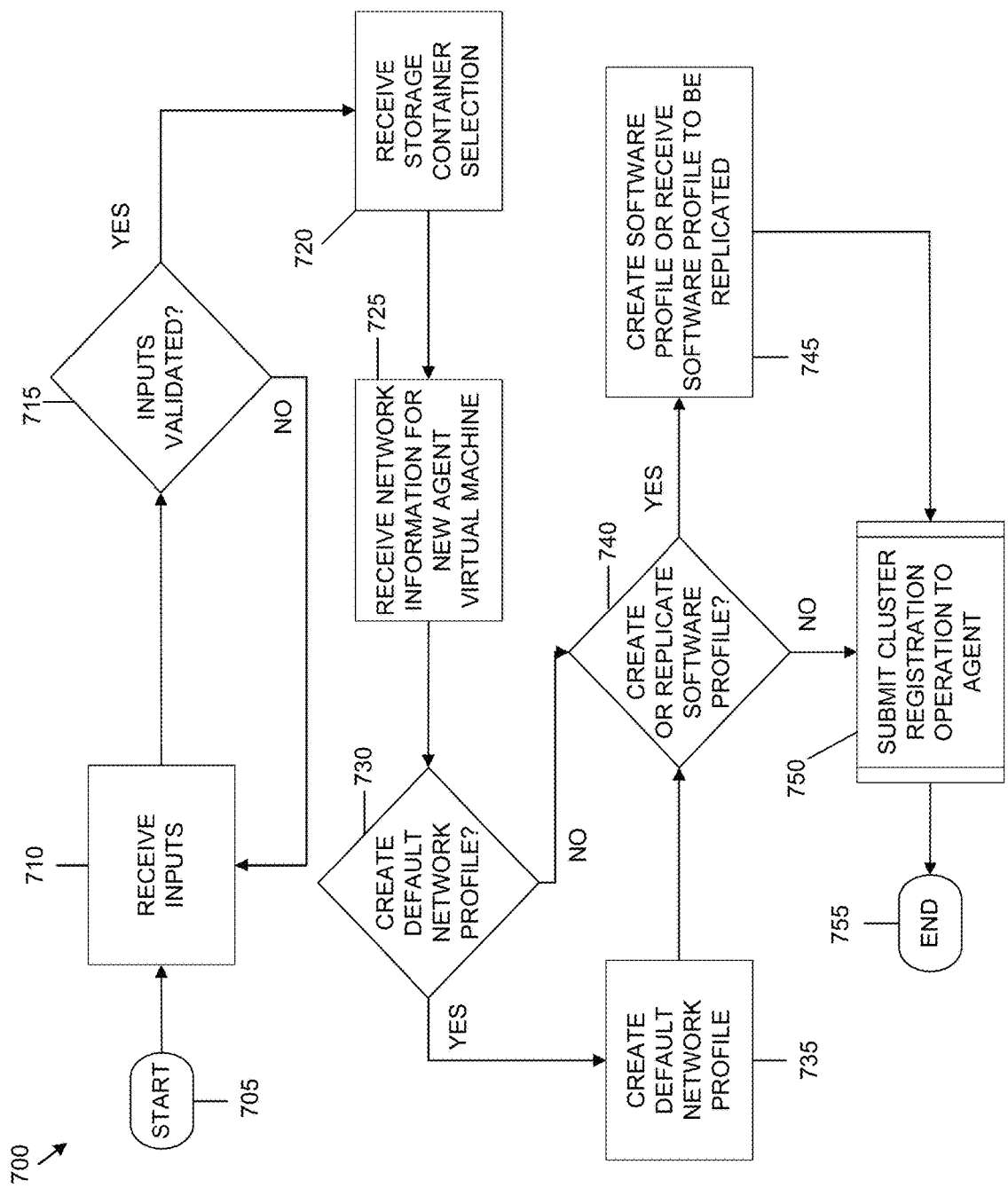
FIGS. 7 and 8 are example flowcharts outlining operations for registering a new cluster in the multi-cluster configuration of FIG. 4, in accordance with some embodiments of the present disclosure.

Referring now to FIG. 7, an example flowchart outlining operations of a process 700 is shown, in accordance with some embodiments of the present disclosure. The process 700 may include other or additional operations depending upon the particular embodiment. The process 700 may be used to add (e.g., register) additional clusters to the multi-cluster configuration. The process 700 may be performed by the server 405 and/or the agent 415. Thus, the process 700 starts at operation 705 upon the completion of the process 600. Once the multi-cluster configuration has been enabled by the process 600, a new cluster (e.g., the clusters 420, 425) may be registered with the server 405. Once registered, the new cluster may be considered part of the multi-cluster configuration. Registering a cluster may include adding a cluster (e.g., the cluster 420) to a list of trusted clusters with the server 405 and installing an agent (e.g., the agent 430) on the added cluster to facilitate communicate between the server 405 and the agent. To register a new cluster, the server 405 receives various inputs from the user at operation 710. For example, the server 405 may receive a cluster name for the new cluster, cluster description of the new cluster, an IP address (and/or other network information) of the new cluster to be registered, a username and password to access the new cluster, user privileges, and/or other cluster details to identify the new cluster and the new cluster's location. Upon receiving the inputs, the server 405 performs input validation at operation 715.

Specifically, the server 405 may check whether the new cluster is reachable and/or available. In other words, the server 405 may check for API connectivity with the APIs associated with the new cluster and whether the user has the appropriate user privileges to register the cluster. The server 405 may also check whether the inputs received at the operation 710 are accurate. For example, the server 405 may check whether the IP address received at the operation 710 is accurate and associated with a cluster. If the server 405 successfully validates the inputs of the operation 710, the process 700 proceeds to operation 720. If the server 405 fails to validate one or more of the inputs, the process 700 loops back to the operation 710 where the server requests additional information from the user (e.g., asks the user to provide correct information).

At the operation 720, the server 405 requests and receives selection from the user of a storage container for the new cluster. In some embodiments, the total storage of a cluster (e.g., the total storage in the storage pool 170) may be divided across different storage containers, and each storage container may have varying requirements for encryption, deduplication, quality of service, etc. When a storage device such as a virtual disk or volume group is created, that storage device may be sourced from a storage container. The storage container may be used to configure remote sites. Specifically, when configuring a remote site, the storage container to which data is replicated to may be identified. At operation 725, the server 405 requests and receives selection of network information for creating a new agent virtual machine on the new cluster. As indicated above, the network information may include network name (e.g., VLAN), DNS, gateway, and subnet mask, IP address, etc. for the agent virtual machine. The server 405 may use the network information to keep track of all agent virtual machines on all the clusters that are registered with the server.

In addition, at operation 730, the server 405 receives indication of whether the user desires to set up a default network profile. In some embodiments, providing a default network profile may be optional. A network profile may be needed for provisioning a database on the new cluster being registered. For example, different networks may be associated with different database engine types. Thus, depending upon the database engine type that the user desires for a database being provisioned, the network profile may vary. In some embodiments, each cluster may be associated with a network profile. Further, in some embodiments, the network profile of one cluster may not be replicated to another cluster. Thus, for each cluster being registered, the server 405 may request a default network profile for that cluster. In some embodiments, a default network profile may be provided as part of registering the new cluster. In other embodiments, a network profile may be provided at the time of provisioning a database. Thus, if the server 405 receives an indication at the operation 730 that the user desires to set up a default network profile, the process 700 proceeds to operation 735 where the server receives inputs from a user to create a default network profile.

Upon creating the default network profile or if no default network profile is desired at the operation 730, the process 700 proceeds to operation 740. At the operation 740, the server 405 requests and receives a selection of a software profile. A software profile defines the software and operating system parameters for the database engine type. Thus, a software profile may be needed for performing provisioning and patching operations. For example, for a PostgreSQL database engine type, the software profile may include one or more software and operations system image profiles associated with PostgreSQL. Each software profile may define the rules that are to be applied in managing the database being patched or provisioned. Each new cluster that is registered with the server 405 and that is desired to have provisioning and patching services may have one or more software profiles associated therewith. In some embodiments, each cluster may be associated with a software profile. In some embodiments, a software profile of one cluster may be replicated to another cluster.

Thus, at the operation 740, the server 405 determines whether the user desires to provide a default software profile or replicate a software profile from another cluster. In some embodiments, the operation 740 may also be optional. If the user desires to provide a default software profile or replicate another software profile, the process 700 proceeds to operation 745 where the server 405 receives inputs from the user to create a software profile or receives a selection of a software profile to be replicated to the cluster being registered. If the user does not desire to provide (e.g., create) a default software profile or replicate a software profile to the new cluster, the process 700 proceeds to operation 750.

Although the process 700 describes the various inputs (e.g., storage container, the network information, network profile, software profile, etc.) to be received in a particular order, it is to be understood that these inputs may be received in any order. Further, at least some of the inputs may be optional. In some embodiments, additional inputs may also be received.

The operation 750 may be reached upon receiving the one or more software profiles at the operation 745 or from the operation 740 if the user does not desire to provide a default software profile or replicate a software profile. At the operation 750, the server 405 requests a new cluster registration operation from an agent (e.g., the agent 415). The agent 415 may then create a new agent virtual machine on the new cluster and configure an agent on the newly created agent virtual machine, as discussed in FIG. 8 below. The process 700 ends at operation 755.

Figure 8:
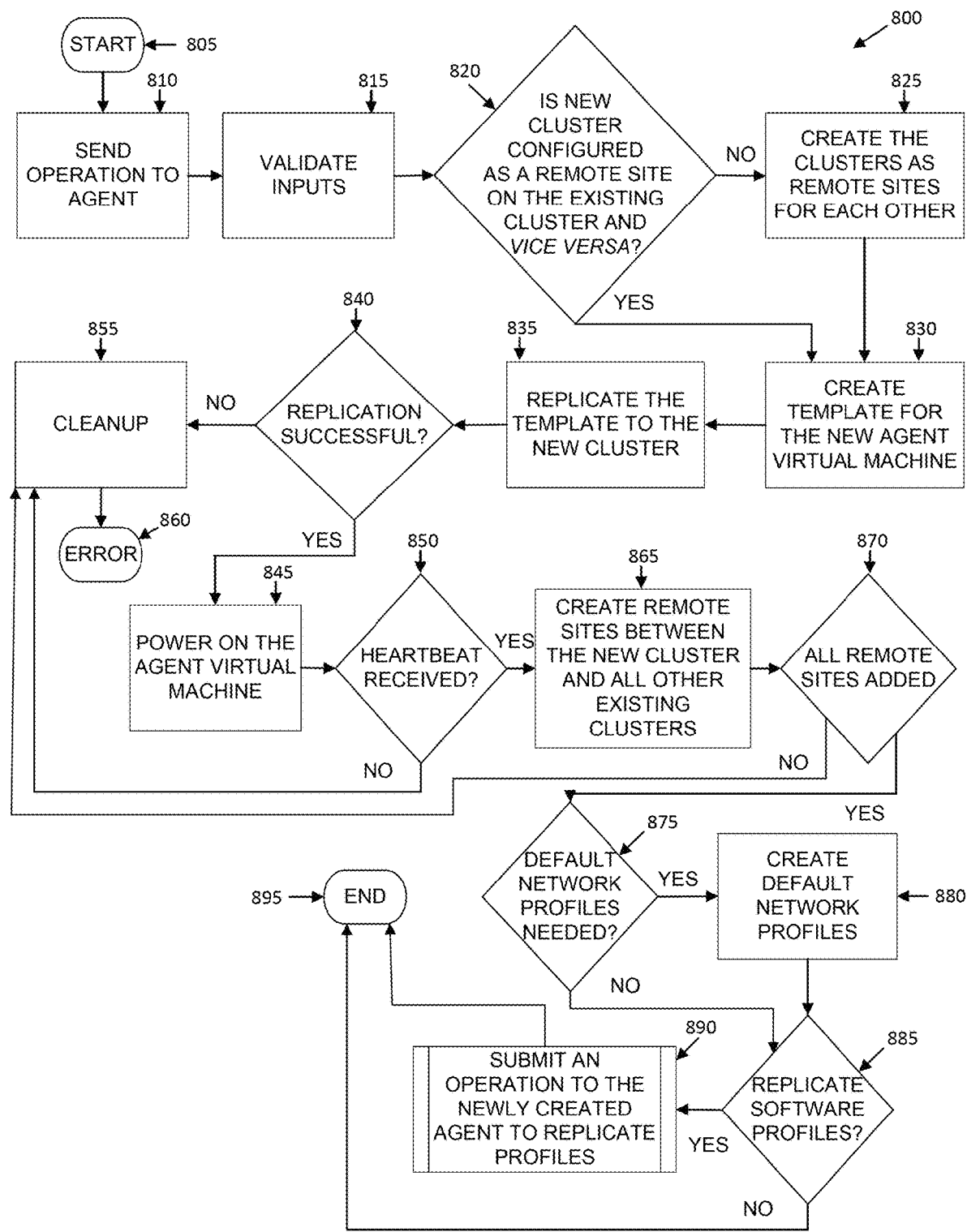

Referring now to FIG. 8, an example flowchart outlining operations of a process 800 is shown, in accordance with some embodiments of the present disclosure. The process 800 may include other or additional operations depending upon the embodiment. The process 800 may be implemented by the server 405 and/or the agent 415. The process 800 describes the operation 750 in greater detail. The process 800 may be used to deploy or create an agent on the cluster being added by the processes 700 and 800 for communicating with the server 405. The process 800 is somewhat similar to the process 600. However, in contrast to the process 600 in which the agent virtual machine is created on the same cluster as the server 405, the process 800 is directed to creating an agent virtual machine on a separate cluster as the server. Thus, the process 800 starts at operation 805.

At operation 810, the server 405 requests the agent 415 perform an operation for creating an agent virtual machine on the newly registered cluster. For explanation purposes only, the newly registered cluster may be the cluster 420 and the newly created agent virtual machine may be for the agent 430. Although the server 405 is described as requesting the agent 415 create the agent virtual machine on the cluster 420, in some embodiments, the server may request the agent of another cluster (e.g., the agent 435 of the cluster 425) create the agent virtual machine on the cluster 420. For example, in some embodiments, the cluster 410 on which the server 405 and the agent 415 are located may be the only cluster in the multi-cluster configuration. In such cases, the server 405 may request the agent 415 (which is the only agent so far in the multi-cluster configuration) create the agent virtual machine on the cluster 420. In some embodiments, the multi-cluster configuration may include the cluster 410 and the cluster 425 (which may have been previously registered with the server 405) having the agents 415 and 435, respectively. In such cases, the server 405 may request either the agent 415 or the agent 435 create the agent virtual machine on the cluster 420. Without intending to be limiting in any way, the explanation below is with respect to the server 405 requesting the agent 415 create the agent virtual machine on the cluster 420.

In some embodiments, as part of creating the agent 415, the server 405 may send the network information (and any other inputs received from the user) at the operation 725 to the agent at the operation 810. At operation 815, the agent 415 validates, similar to the operation 610, the inputs (e.g., the network information) received from the server 405 at the operation 810. The agent 415 may also determine whether the cluster 420 has sufficient resources to create the agent virtual machine thereon. In some embodiments, the agent 415 may also check whether a remote site is already configured between the cluster 410 and the cluster 420. In some embodiments, a user may have configured a remote site on the cluster 420 ahead of time. In such a case, the server 405 may not use the existing configuration of that previously created remote site. The agent 415 may perform any other checks that may be desirable or considered useful.

Upon validating the inputs, at operation 820, the agent 415 determines whether the cluster 420 is configured as a remote site of the cluster 410 (e.g., of the cluster on which the agent that received the request of the operation 810 is located). Similarly, the agent 415 may determine whether the cluster 410 is configured as remote site for the cluster 420. By configuring clusters as remote sites of each other, data (including snapshots) may be replicated between them. If the agent 415 determines that the cluster 420 is not configured as a remote site for the cluster 410 or vice-versa, the process 800 proceeds to operation 825 where the agent 415 configures the clusters 410 and 420 as remote sites of each other. In some embodiments, the server 405 may use designated APIs to configure a remote site on a cluster. Upon configuring the clusters 410 and 420 as remote sites of each other, or if the clusters were already configured as remote sites of each other at the operation 820, the process 800 proceeds to operation 830.

At the operation 830, the agent 415 prepares an operating disk for the new agent virtual machine on the cluster 420. In some embodiments, the agent 415 may have an image of a template operating disk file available for creating the agent virtual machines on other clusters. In some embodiments, the agent 415 may clone its own operating disk file. The operation 830 may also update an operating system configuration file, via offline disk processing, to update network information (e.g., to include the network information of the agent virtual machine to be created), assign a UUID, and/or take other actions that may be needed to create the agent virtual machine on the cluster 420. The operation 830 is similar to the operation 625. Thus, at the operation 830, the agent 415 prepares a template for creating the agent virtual machine on the cluster 420.

The agent 415 takes a snapshot of the template and copies or replicates the template (e.g., the operating disk file) to the cluster 420 at operation 835. At operation 840, the agent 415 determines if the replication of the template was successful. If the replication was successful, the at operation 845, the agent 415 creates an agent virtual machine on the cluster 420 in accordance with the template similar to the operation 630. In some embodiments, the agent virtual machine on the cluster 420 may have the same compute size as the agent virtual machine of the agent 415. The agent 415 powers on the newly created agent virtual machine on the cluster 420 at operation 845. Upon successfully powering on the newly created virtual machine, the agent 415 runs scripts on the newly created virtual machine to install the agent 430. The agent 415 then waits to receive a heartbeat from the agent 430/the agent virtual machine at operation 850. The operations 840 and 845 are similar to the operations 635, 640, and 655, while the operation 850 is similar to the operation 660.

If, at the operation 840, the agent 415 determines that the replication of the template to the cluster 420 was not successful, the agent deletes the template at operation 855 and issues an error alert to the user at operation 860. The operations 855 and 860 are similar to the operations 645 and 650, respectively. The operation 840 may also be reached from the operation 850 if the agent 415 does not receive a heartbeat from the newly created virtual machine on the cluster 420. If the agent 415 does receive a heartbeat from the agent 430/the newly created agent virtual machine on the cluster 420 within a predetermined time period, the process 800 proceeds to operation 865.

At the operation 865, the agent 415 configures the cluster 420 as a remote site of any other existing cluster in the multi-cluster architecture. For example, if the cluster 425 was previously registered with the server 405, the agent 415 may register the cluster 420 as a remote site of the cluster 425. Similarly, the agent 415 may register the cluster 425 as a remote site of the cluster 425. By keeping the operations 825 and 865 separate, the server 405 may ensure that the other registered clusters (e.g., the cluster 425) are configured as remote sites of the newly registered cluster (e.g., the cluster 420) only if the installation of an agent is successful on the newly registered cluster (e.g., the cluster 420). At operation 870, if the agent 415 successfully configures the cluster 420 and the other existing clusters in the multi cluster architecture as remote sites of each other, the process 800 proceeds to operation 875. Otherwise, the process 800 proceeds to the operation 855.

At the operation 875, the agent 415 determines if the cluster 420 needs to be configured with the default network profiles that were received in the process 700. For example, in some embodiments, if the agent 415 receives a network profile from the server 405, the agent may determine that default network profile is needed. In some embodiments, the agent 415 may poll the server 405 and the server may request default network profile on the cluster 420. Thus, if the agent 415 determines that a default network profile is needed on the cluster 420, the agent 415 designates the network profile received in the process 700 to be replicated to the cluster 420 at operation 880. If no default network profile is needed on the cluster 420 or if the network profile has been designated for replication at the operation 880, the agent 415 determines if a default software profile is needed on the cluster 420 at operation 885.

Similar to the network profile, the agent 415 may determine that a default software profile is needed if the agent receives a software profile from the server 405 or if the agent pols the server and server sends the software profile. If a default software profile is needed on the cluster 420, the software profile received from the server 405 is designated to be replicated to the cluster 420. If at least one of the network profile or the software profile is needed, the agent 415 requests the agent 430 on the cluster 420 to replicate the network and software profiles to the cluster 420 at operation 890. If no network profile and no software profile is needed, the process 800 ends at operation 895.

Thus, to convert a single-cluster configuration into a multi-cluster configuration, the server and agent that are co-located on the same virtual machine are split into separate virtual machines of the same cluster, as discussed above in FIGS. 5 and 6. Upon splitting the server and the agent, additional clusters may be registered with the server that was split, as discussed in FIG. 7. The registration allows the server (e.g., the server 405) to become aware of the registered clusters and allow communications with the registered clusters. An agent virtual machine may be created on the registered cluster to install an agent thereon. The agent may be configured to communicate with the server 405 directly. Thus, the present disclosure provides a simple and easy mechanism to convert a single-cluster configuration of a database management system into a multi-cluster configuration of the database management system. In some embodiments, the user may be presented one or more user interfaces to request the various inputs discussed above.

Upon installing the agents, in some embodiments, the server 405 and/or the agents 415, 430, and 435 may need to be updated. In some embodiments, the database server virtual machines (e.g., the virtual machines on which databases are located) may also need to be updated. For example, in some embodiments, the agents 415, 430, and 435 may need to be updated to add additional functionality. In some embodiments, the server 405, the agents 415, 430, and 435, and/or the database server virtual machines on the various clusters may need to be updated with security fixes or for any other reason. When any such update or upgrade is desired where the server 405 needs to be updated along with the agents 415, 430, 435 and/or the database server virtual machines, in some embodiments, the server may be updated before the agents and the database server virtual machines. Upon updating the server 405, the agents 415, 430, 435 may be updated in one of two ways. A first way may be to update the agents 415, 430, 435 before updating the database server virtual machines. Upon updating the agents, the database server virtual machines may be updated. This approach is discussed below in FIG. 9. A second way may be to update the agents 415, 430, 435 and the database server virtual machines in parallel. This approach is discussed in FIG. 10 below. The terms "update" and "upgrade" are used interchangeably in FIGS. 9 and 10.

Figure 9:
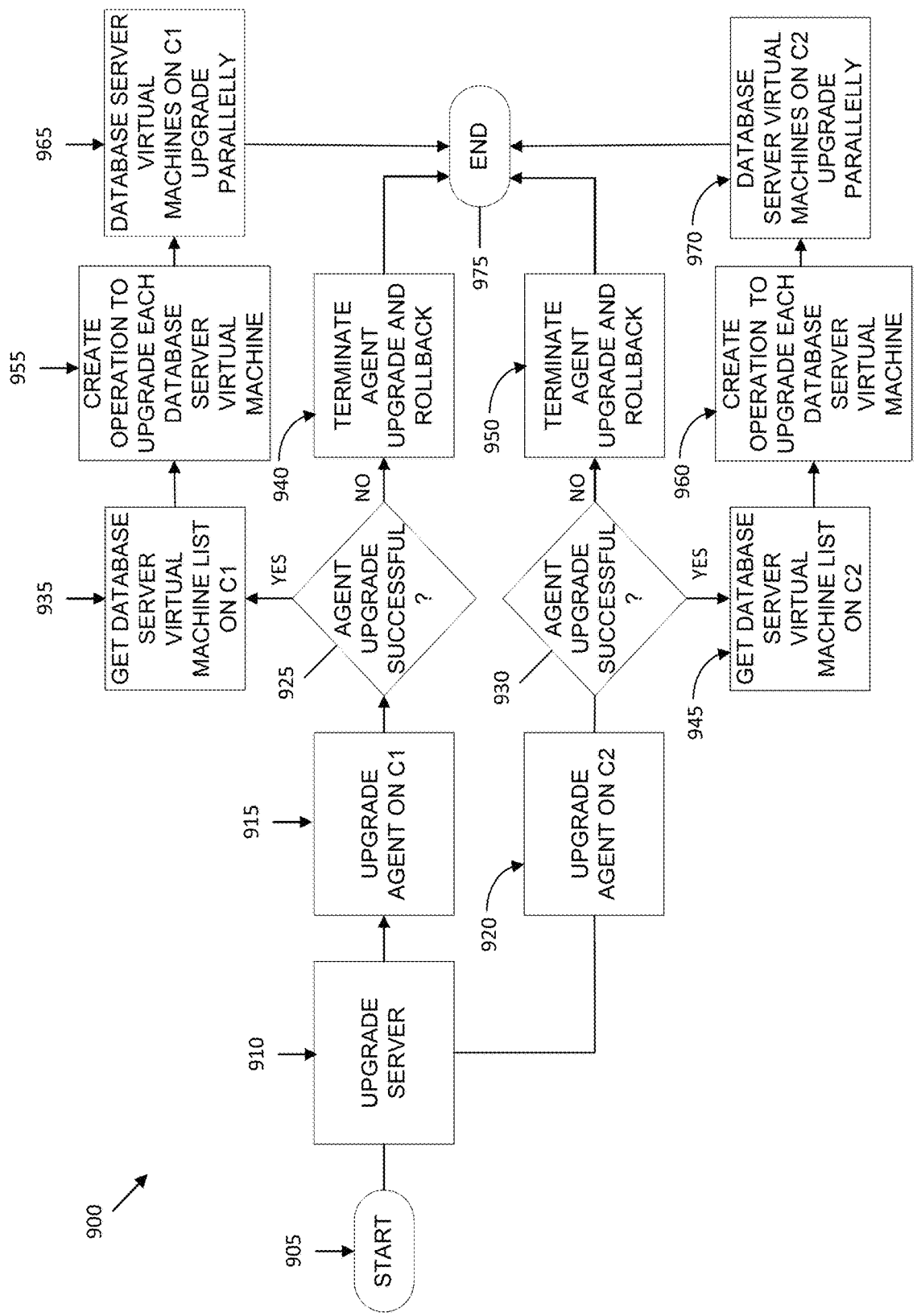
FIG. 9 is an example flowchart outlining operations for upgrading an agent in the multi-cluster configuration of FIG. 4, in accordance with some embodiments of the present disclosure.

Turning to FIG. 9, an example flowchart outlining operations of a process 900 is shown, in accordance with some embodiments of the present disclosure. The process 900 may include other or additional operations depending upon the particular embodiment. The process 900 may be implemented by the server 405. The process 900 may begin at operation 905 with the server 405 receiving an indication to update the server, the agents 415, 430, 435, and the database server virtual machines. At operation 910, the server 405 may update itself. In some embodiments, the server 405 may update itself by downloading and installing the upgrade software or package. In some embodiments, the server 405 may be associated with a life cycle manager that the server may use to facilitate the upgrade. In other embodiments, the server 405 may use other mechanisms to upgrade itself.

Further, in some embodiments, the server 405 may complete any existing or ongoing operations before starting the upgrade. In some embodiments, when all the existing or ongoing operations have completed, the server 405 may place a hold on any new operations. Upon placing a hold on the new operations, the server 405 may start the upgrade process. Upon completing the upgrade of itself, the server 405 starts upgrading the various agents. In some embodiments, the server 405 may upgrade all the agents (including the agent on the cluster on which the server is located) in parallel. For example, as shown at operations 915 and 920, the server 405 may upgrade the agent on cluster, C1, and the agent on cluster, C2, respectively in parallel. Although only two clusters (e.g., C1 and C2) are shown in FIG. 9, in other embodiments, fewer or greater than two clusters may be present, and their respective agents may be upgraded in parallel. In other embodiments, the various agents may be updated serially.

In some embodiments, to upgrade an agent, the server 405 may send the upgrade package to that agent. In other embodiments, the server 405 may send the location to the agent from where the agent may receive the upgrade package. At operations 925 and 930, the server 405 determines if the agents successfully upgraded. For example, at the operation 925, the server 405 determines whether the agent on the cluster, C1, successfully upgraded. Similarly, at the operation 930, the server 405 determines if the agent on the cluster, C2, successfully upgraded.

If the server 405 determines that the agent on the cluster, C1, successfully upgraded at the operation 925, the process 900 proceeds to operation 935. Otherwise, the process 900 proceeds to operation 940. Similarly, if the server 405 determines that the agent on the cluster, C2, successfully upgraded at the operation 930, the process 900 proceeds to operation 945. Otherwise, the process 900 proceeds to operation 950. At the operations 935 and 945, the server 405 determines all the database server virtual machines that are located on the clusters, C1 and C2, respectively. In some embodiments, the server may determine which database server virtual machines are located on the clusters, C1 and C2, by reviewing metadata associated with the clusters, C1 and C2, or in any other way. At operations 955 and 960, the server 405 creates an operation to upgrade the database server virtual machines on the clusters, C1 and C2, respectively. In some embodiments, the server 405 may request the agents on the cluster, C1 and C2, to perform the operation of upgrading the database server virtual machines. At operation 965, the database server virtual machines on the cluster, C1, are upgraded in parallel. Similarly, at operation 970, the database server virtual machines on the cluster, C2, are upgraded in parallel. Further, in some embodiments, the database server virtual machines on the clusters, C1 and C2, are upgraded in parallel. In some embodiments, at least some of the database server virtual machines may be upgraded serially.

Upon upgrading all the database servers, on the clusters, C1 and C2, at the operations 965 and 970 respectively, the process 900 ends at operation 975. At the operations 940 and 950 if the agents on the clusters, C1 and C2, did not update successfully, the upgrade is terminated. For example, if the agent on the cluster, C1, fails to update at the operation 925, the database server virtual machines on that cluster are not updated and the update on the agent is terminated at the operation 940. Similarly, if at the operation 930, the agent on the cluster, C2, did not complete updating, the database server virtual machines on that cluster are not updated and the update on the agent is terminated at the operation 950. At the operations 940 and 950, a rollback operation may also be performed to move the respective agents to a state before the upgrade starts at the operations 915 and 920. Upon terminating the upgrade, the process 900 ends at the operation 975.

Advantageously, by upgrading the agent of a particular cluster before upgrading the database server virtual machines on that cluster, any inconsistencies or failures between the agent and the database cluster virtual machines may be avoided. If the agent fails to upgrade, the database server virtual machine upgrades may not be triggered, thereby avoiding unnecessary upgrade operations.

Figure 10:
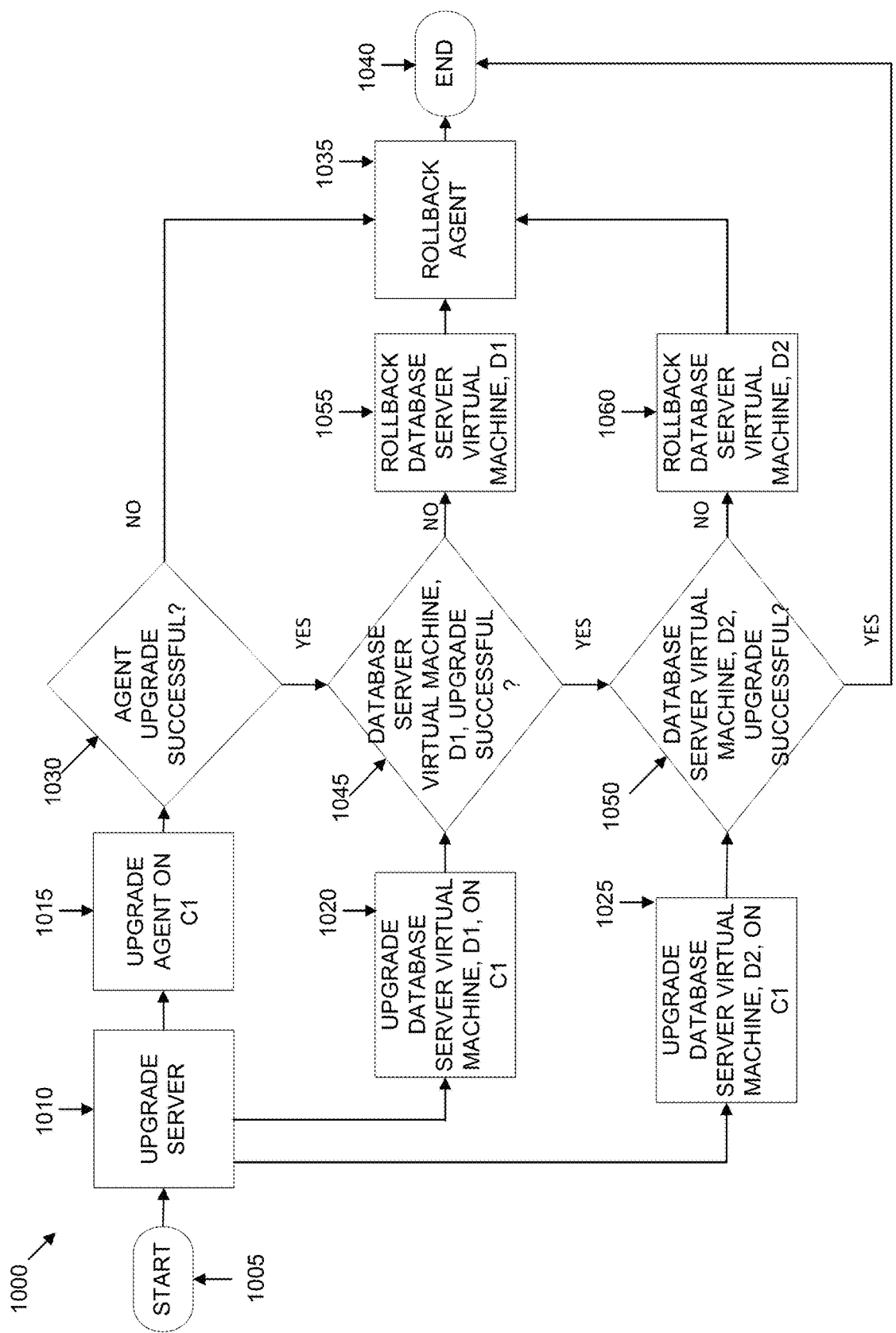
FIG. 10 is another example flowchart outlining operations for upgrading an agent in the multi-cluster configuration of FIG. 4, in accordance with some embodiments of the present disclosure.

Referring to FIG. 10, an example flow chart outlining operations for a process 1000 is shown, in accordance with some embodiments of the present disclosure. The process 1000 may include other or additional operations depending on the particular embodiment. The process 1000 may be implemented by the server 405. Thus, the process 1000 starts at operation 1005 upon receiving an indication for an upgrade. At operation 1010, the server 405 upgrades itself similar to the operation 910. Upon completing the upgrade on itself, the server 405 upgrades the agent and database server virtual machines on each cluster in parallel. For example, at operation 1015, the server 405 upgrades the agent on cluster, C1. At operations 1020 and 1025, the server 405 also updates the database server virtual machines D1 and D2, on the cluster, C1, in parallel. Thus, the operations 1015, 1020, 1025 occur in parallel. Although only two database server virtual machines are shown in the cluster, C1, in other embodiments, greater than or fewer than two database server virtual machines may be present on the cluster, C1, and all of them may be updated in parallel. Further, although a single cluster, C1, is shown in FIG. 10, more than one cluster may be present and the agent on each of the clusters may be updated in parallel along with their respective database server virtual machines.

At operation 1030, the server 405 determines if the agent on the cluster, C1, successfully upgraded. In some embodiments, the server 405 may determine that the agent on the cluster, C1, successfully upgraded upon receiving an indication from the agent. In other embodiments, the server 405 may determine that the agent on the cluster, C1, successfully upgraded in other ways. If the server 405 determines that the agent on the cluster, C1, did not successfully upgrade at the operation 1030, the server rolls back the agent to the pre-upgrade state at operation 1035 and the process 1000 ends at operation 1040. On the other hand, if at the operation 1030, the server 405 determines that the agent on the cluster, C1, successfully upgraded, the process 1000 proceeds to operation 1045.

At the operation 1045, the server 405 determines if the database server virtual machine, D1, successfully upgraded. If yes, the server 405 then determines if the database server virtual machine, D2, successfully upgraded at operation 1050. Similarly, the server 405 may determine, for each database server virtual machine in the cluster, C1, whether that database server virtual machine successfully upgraded. Upon successfully upgrading all the database server virtual machines in the cluster, C1, the process 1000 ends at the operation 1040. If the database server virtual machine, D1, did not successfully upgrade at the operation 1045, the server 405 rolls back the database server virtual machine, D1, to its pre-upgrade state at operation 1055. Upon rolling back the database server virtual machine, D1, to its pre-upgrade state, the server 405 also rolls back the agent on the cluster, C1, at the operation 1035 to prevent any failure in communication between the agent and the database server virtual machine, D1. Similarly, if the upgrade of the database server virtual machine, D2, fails at the operation 1050, the server 405 rolls back the database server virtual machine, D2, to its pre-upgrade state at operation 1060. Upon rolling back the database server virtual machine, D2, to its pre-upgrade state, the server 405 also rolls back the agent on the cluster, C1. Thus, if any database server virtual machine fails to upgrade, the agent is rolled back to its pre upgrade state.

Advantageously, by upgrading the database server virtual machines and the agent in parallel, the upgrade can be performed quicker compared to the process 900. Further, the server 405 may be able to upgrade both the agent and the database server virtual machines, requiring fewer upgrade operations and less complexity of the agents (e.g., since the server is updating the database server virtual machines instead of the agent). However, in some cases, the agent may be upgraded successfully but if a database server virtual machine on that cluster fails to upgrade, the agent may need to be rolled back to its pre-upgraded state, thereby increasing the complexity of the upgrade process. Further, in some embodiments if a database server virtual machine successfully upgrades in a cluster and another database server virtual machine in that cluster fails to upgrade, then the database server virtual machine that successfully upgraded may need to be rolled back, leading to additional complexity and wasted time.

Figure 11:
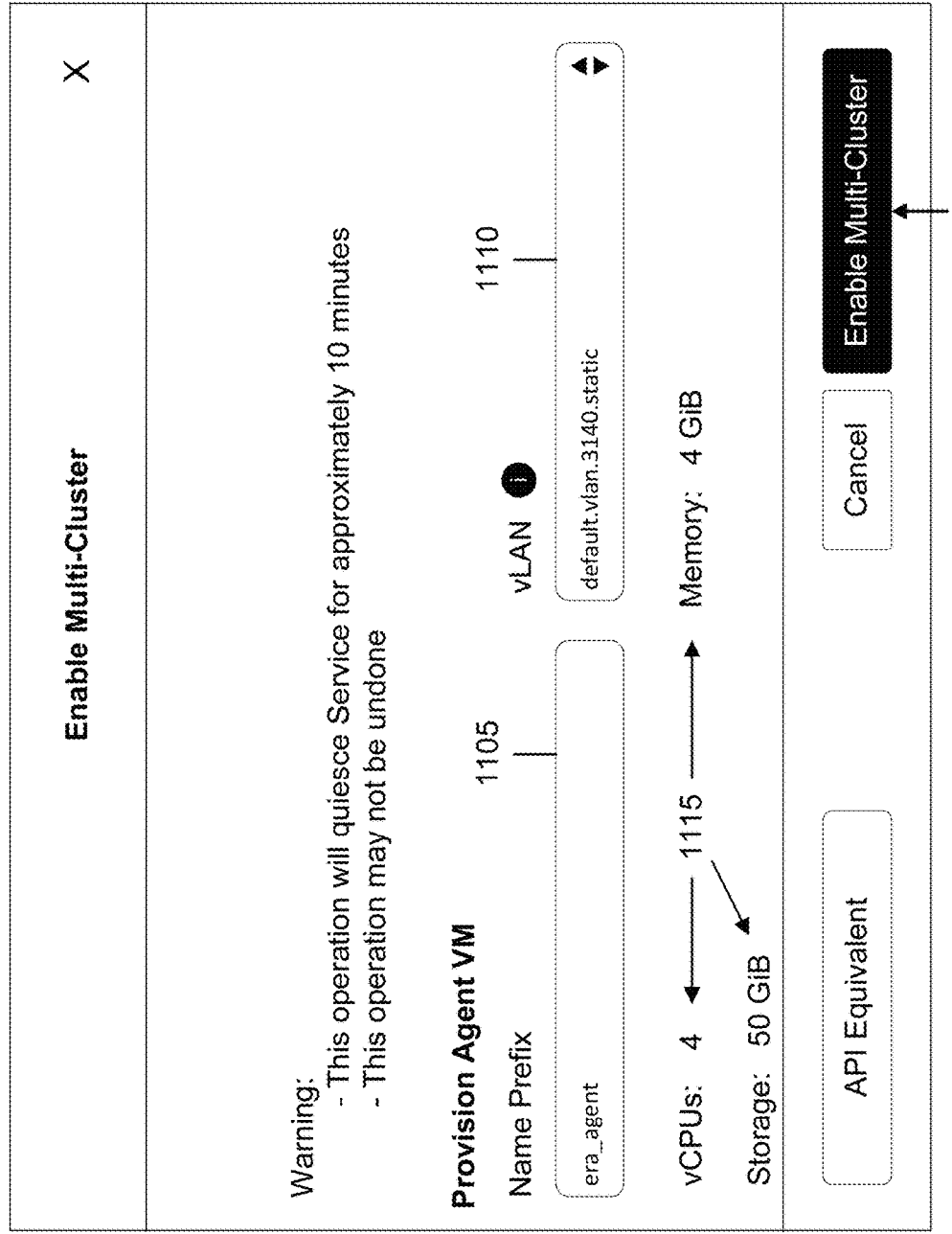
FIG. 11 is an example user interface showing enabling of the multi-cluster configuration of FIG. 4, as described in FIGS. 5 and 6, in accordance with some embodiments of the present disclosure.
Figure 12A:
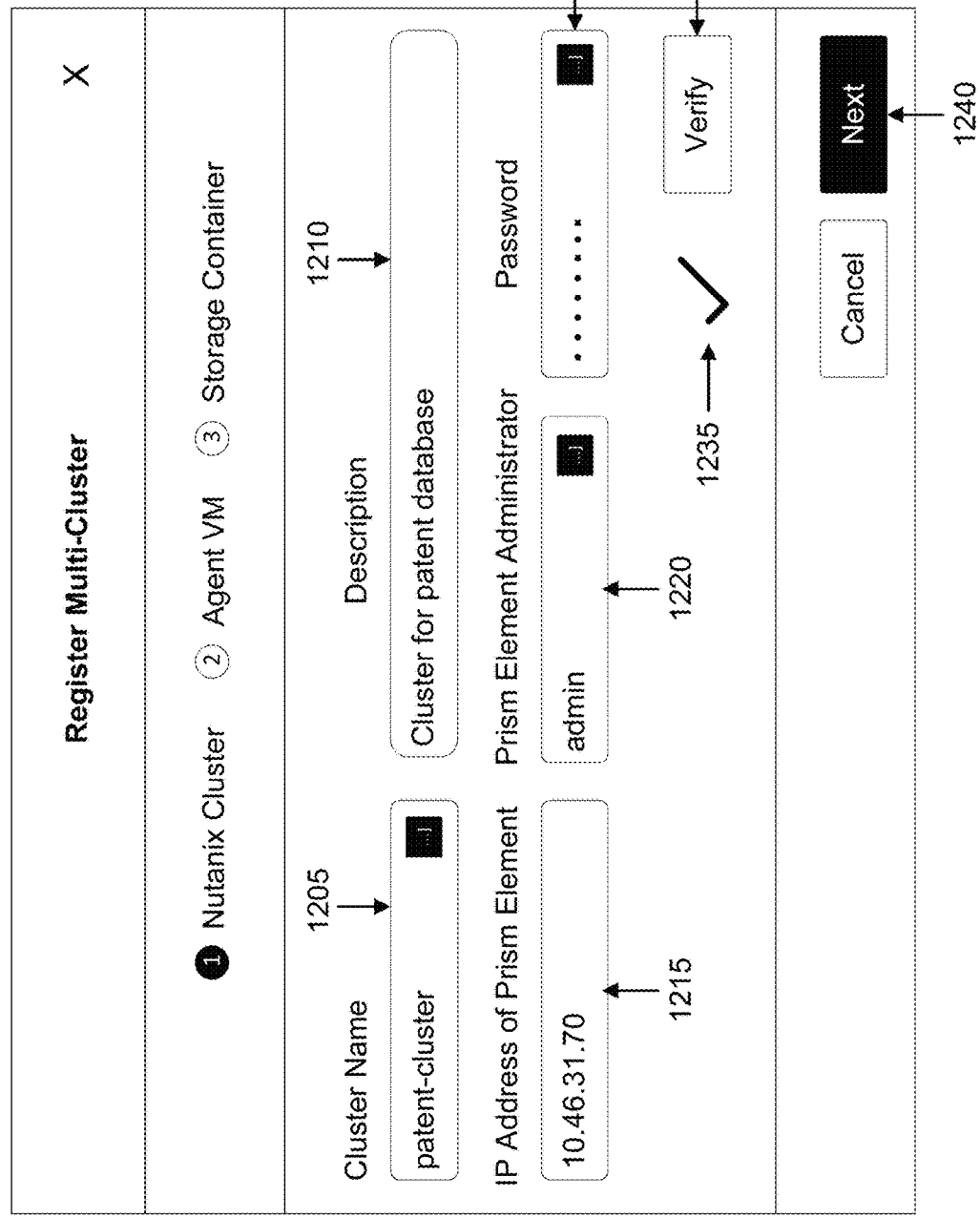
Figure 12B:
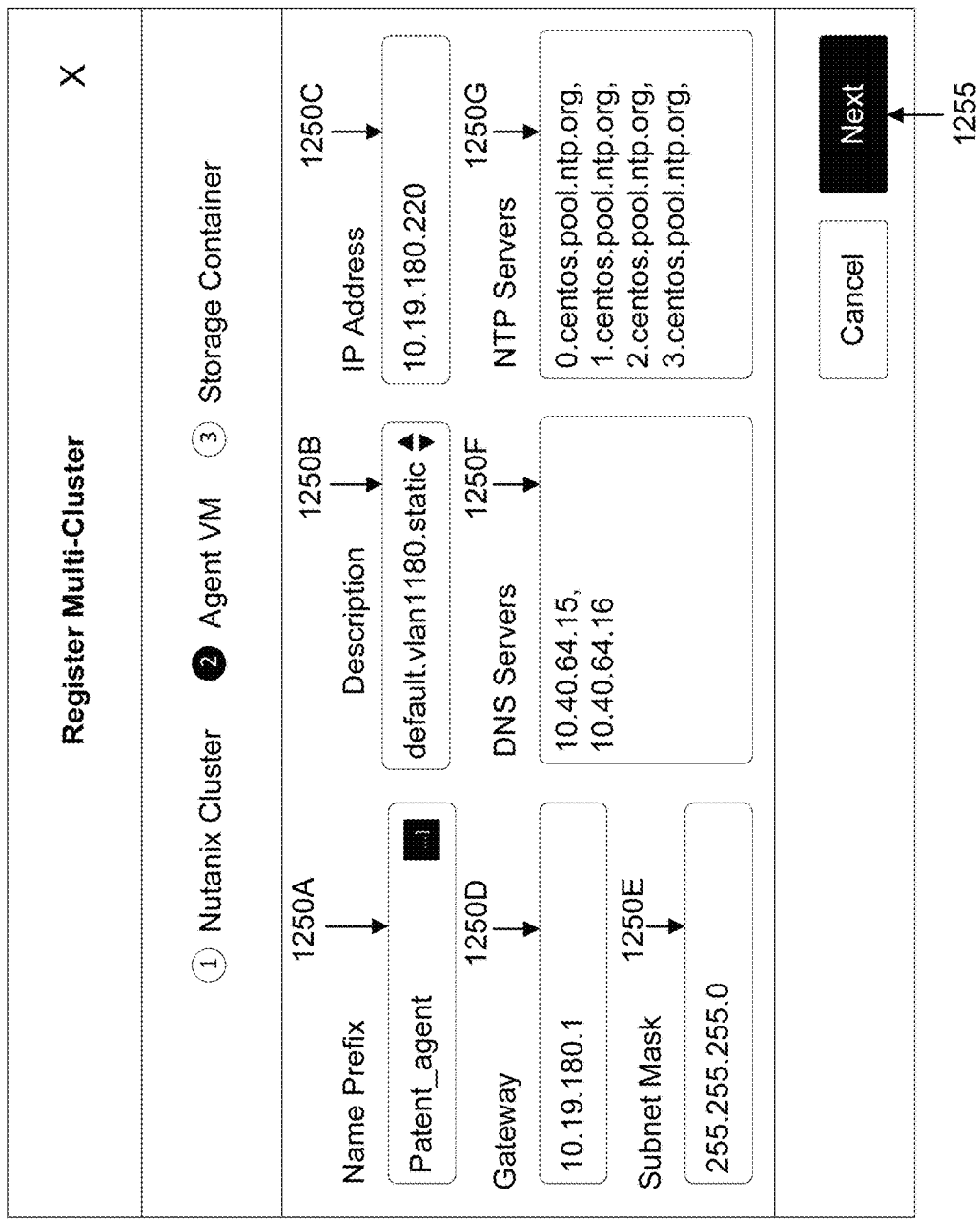

Turning now to FIGS. 11-12C, example user interfaces are shown, in accordance with some embodiments of the present disclosure. It is to be understood that the user interfaces of FIGS. 11-12C are only an example and may vary from one embodiment to another. Further, the shapes, sizes, orientation, and other details of the various features shown in a particular user interface may vary from one embodiment to another. Further, additional or other type of data may be requested in one or more use interfaces. FIG. 11 shows an example user interface for enabling a multi-cluster configuration, or in words, converting a single-cluster configuration into a multi-cluster configuration. FIGS. 12A-12C show example user interfaces for registering an additional cluster with the multi-cluster configuration.

Referring now to FIG. 11, an example user interface 1100 is shown, in accordance with some embodiments of the present disclosure. The user interface 1100 is configured to enable the multi-cluster configuration. Thus, the user interface 1100 is configured to receive information from a user to split the server 405 and the agent 415 that are co-located on a single virtual machine in a single-cluster configuration. For example, the user interface 1100 may be configured to receive a name 1105 for the new agent virtual machine to be created for the agent 415 on the cluster 410. The user interface 1100 may also be configured to receive network information 1110 to indicate the network where the new agent virtual machine is to be created. The user interface 1100 also shows compute details 1115 indicating memory, number of virtual CPUs, and other details for creating the agent virtual machine. In some embodiments, the compute details 1115 may be set by default. In other embodiments, one or more of the compute details 1115 may be solicited from the user.

Upon providing the name 1105 and the network information 1110, the user may click on an enable multi-cluster button 1120 to convert a single-cluster configuration into a multi-cluster configuration. Thus, the user interface 1100 provides an easy and convenient mechanism to convert a single-cluster configuration into a multi-cluster configuration. The user interface 1100 corresponds to the process 500. In some embodiments, the user interface 1100 may be presented through the dashboard 210. Upon clicking on the enable multi-cluster button 1120, the process 600 may be executed to have the server 405 and the agent 415 located on different virtual machines on the same cluster (e.g., the cluster 410).

Now referring to FIG. 12A, an example user interface 1200 is shown, in accordance with some embodiments of the present disclosure. The user interface 1200 may be used to register an additional cluster with the server 405. The user interface 1200 may be presented to the user through the dashboard 210. In some embodiments, the user interface 1200 may be presented after the user clicks on the enable multi-cluster button 1120. In some embodiments, the user interface 1200 may present fields to request a name 1205 for the cluster to be registered with the server 405, a description 1210 for the cluster to be registered with the server, an IP address 1215 indicating a location of the cluster to be registered, user privileges 1220, and a password 1225. The name 1205, the description 1210, the IP address 1215, the user privileges 1220, and the password 1225 may be inputs that are received at the operation 710.

The user may click on a verify button 1230 to validate at least the IP address 1215 and the user privileges 1220. The validation corresponds to the operation 715. If validation is successful, the user may receive an indication 1235. If validation is not successful, the indication 1235 may have a different notification (e.g., a cross mark). If the indication 1235 indicates a successful validation, the user may click on a button 1240 to be taken to a user interface 1245 of FIG. 12B. Via the user interface 1245, the user may provide details for creating the agent virtual machine for installing an agent on the cluster that is being registered by the user interface 1200.

For example, a user may be requested to provide a name 1250A for the agent virtual machine, a description 1250B of the agent virtual machine, an IP address 1250C of the agent virtual machine, a gateway 1250D of the agent virtual machine, a subnet mask 1250E, DNS servers 1250F, and Network Time Protocol (NTP) servers 1250G to provide network information for creating the agent virtual machine.

Upon providing the various details for creating the agent virtual machine, the user may click on a next button 1255 to be transferred to a user interface 1260 of FIG. 12C. The user interface 1260 may be used to provider storage container details. In some embodiments, the user interface 1260 may be presented through the dashboard 210. The user interface 1260 may provide a list 1265 of available storage containers that the user may choose from. Upon selecting at least one storage container from the list 1265, the user may click on a register button 1270 to start the registration process. Upon clicking on the register button 1270, the server 405 submits the registration operation to the agent 415 at the operation 750 and the process 800 is implemented. In some embodiments, although not shown, in some embodiments, the user may be presented additional one or more user interfaces to receiving selection of a network profile and/or a software profile.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A non-transitory computer-readable media comprising computer-readable instructions stored thereon that when executed by a processor of a database management system cause the processor to:
   receive first network information to convert a single-cluster configuration of the database management system into a multi-cluster configuration of the database management system, wherein in the single-cluster configuration, a server and a first agent are co-located on a first virtual machine (VM);
   convert the single-cluster configuration into the multi-cluster configuration by changing a location of the first agent from the first VM to a second VM based upon the first network information, wherein in the multi-cluster configuration, the server is located on the first VM and the first agent is located on the second VM;
   receive second network information to register a second cluster with the server upon conversion to the multi-cluster configuration; and
   create a second agent on the second cluster upon registering the second cluster,
   wherein the server provides a database management service via the first agent and the second agent in the multi-cluster configuration.

2. The non-transitory computer-readable media of claim 1, further comprising computer-readable instructions that when executed by the processor cause the processor to receive third network information to create a third virtual machine on the second cluster, wherein the second agent is installed on the third virtual machine.

3. The non-transitory computer-readable media of claim 1, further comprising computer-readable instructions that when executed by the processor cause the processor to present at least one user interface to receive the first network information and the second network information.

4. The non-transitory computer-readable media of claim 1, wherein the first network information comprises a virtual local area network.

5. The non-transitory computer-readable media of claim 1, wherein the second network information comprises an IP address of the second cluster.

6. The non-transitory computer-readable media of claim 1, further comprising computer-readable instructions that when executed by the processor cause the processor to:
   wait for existing operations to complete on the first cluster before conversion of the single-cluster configuration into the multi-cluster configuration;
   place a hold on new operations on the first cluster upon completion of the existing operations; and
   release the hold on the new operations upon completing the conversion of the single-cluster configuration into the multi-cluster configuration.

7. The non-transitory computer-readable media of claim 1, further comprising computer-readable instructions that when executed by the processor cause the processor to:
   create the second virtual machine on the first cluster;
   create the first agent on the second virtual machine; and
   move data associated with the first agent from the first virtual machine to the second virtual machine.

8. A method comprising:
   receiving, by a processor executing computer-readable instructions stored on a memory, first network information to convert a single-cluster configuration of the database management system into a multi-cluster configuration of the database management system, wherein in the single-cluster configuration, a server and a first agent are co-located on a first virtual machine (VM);
   converting, by the processor, the single-cluster configuration into the multi-cluster configuration by changing a location of the first agent from the first VM to a second VM based upon the first network information, wherein in the multi-cluster configuration, the server is located on the first VM and the first agent is located on the second VM;
   receiving, by the processor, second network information for registering a second cluster with the server upon conversion to the multi-cluster configuration; and
   creating, by the processor, a second agent on the second cluster upon registering the second cluster,
   wherein the server provides a database management service via the first agent and the second agent in the multi-cluster configuration.

9. The method of claim 8, further comprising receiving, by the processor, third network information to create a third virtual machine on the second cluster, wherein the second agent is installed on the third virtual machine.

10. The method of claim 8, further comprising presenting, by the processor, at least one user interface to receive the first network information and the second network information.

11. The method of claim 8, wherein the first network information comprises a virtual local area network.

12. The method of claim 8, wherein the second network information comprises an IP address of the second cluster.

13. The method of claim 8, further comprising:
   waiting, by the processor, for existing operations to complete on the first cluster before conversion of the single-cluster configuration into the multi-cluster configuration;
   placing, by the processor, a hold on new operations on the first cluster upon completion of the existing operations; and
   releasing, by the processor, the hold on the new operations upon completing the conversion of the single-cluster configuration into the multi-cluster configuration.

14. The method of claim 8, further comprising:
   creating, by the processor, the second virtual machine on the first cluster;
   creating, by the processor, the first agent on the second virtual machine; and
   moving, by the processor, data associated with the first agent from the first virtual machine to the second virtual machine.

15. A system comprising:
   a hardware memory storing computer-readable instructions thereon; and
   a hardware processor that executes the computer-readable instructions to:
      receive first network information to convert a single-cluster configuration of the database management system into a multi-cluster configuration of the database management system, wherein in the single-cluster configuration, a server and a first agent are co-located on a first virtual machine (VM);
      convert the single-cluster configuration into the multi-cluster configuration by changing a location of the first agent from the first VM to a second VM based upon the first network information, wherein in the multi-cluster configuration, the server is located on the first VM and the first agent is located on the second VM;

receive second network information to register a second cluster with the server upon conversion to the multi-cluster configuration; and create a second agent on the second cluster upon registering the second cluster, wherein the server provides a database management service via the first agent and the second agent in the multi-cluster configuration.

16. The system of claim 15, wherein the hardware processor further executes computer-readable instructions stored on the hardware memory to receive third network information to create a third virtual machine on the second cluster, wherein the second agent is installed on the third virtual machine.

17. The system of claim 15, wherein the hardware processor further executes computer-readable instructions stored on the hardware memory to present at least one user interface to receive the first network information and the second network information.

18. The system of claim 15, wherein the first network information comprises a virtual local area network.

19. The system of claim 15, wherein the second network information comprises an IP address of the second cluster.

20. The system of claim 15, wherein the hardware processor further executes computer-readable instructions stored on the hardware memory to:

wait for existing operations to complete on the first cluster before conversion of the single-cluster configuration into the multi-cluster configuration;

place a hold on new operations on the first cluster upon completion of the existing operations; and release the hold on the new operations upon completing the conversion of the single-cluster configuration into the multi-cluster configuration.

21. The system of claim 15, wherein the hardware processor further executes computer-readable instructions stored on the hardware memory to:

create the second virtual machine on the first cluster;

create the first agent on the second virtual machine; and move data associated with the first agent from the first virtual machine to the second virtual machine.

* * * * *